US012448585B2

(12) United States Patent
Jumaine et al.

(10) Patent No.: US 12,448,585 B2
(45) Date of Patent: Oct. 21, 2025

(54) PRODUCTION OF CYLINDER OIL

(71) Applicant: A.P. Møller-Mærsk A/S, Copenhagen K (DK)

(72) Inventors: Shamba Jumaine, Copenhagen K (DK); Henrik Bak Weimar, Copenhagen K (DK); Mark Patrick Embleton, Copenhagen K (DK)

(73) Assignee: A.P. Møller-Mærsk A/S, Copenhagen (DK)

( * ) Notice: Subject to any disclaimer, the term of this patent is extended or adjusted under 35 U.S.C. 154(b) by 0 days.

(21) Appl. No.: 18/447,398

(22) Filed: Aug. 10, 2023

(65) Prior Publication Data

US 2023/0383213 A1 Nov. 30, 2023

Related U.S. Application Data

(63) Continuation of application No. PCT/EP2022/053288, filed on Feb. 10, 2022.

(30) Foreign Application Priority Data

Feb. 11, 2021 (DK) ............................. PA202100158

(51) Int. Cl.
*C10M 171/02* (2006.01)
*C10N 20/02* (2006.01)
(Continued)

(52) U.S. Cl.
CPC ............ *C10M 171/02* (2013.01); *F01M 9/02* (2013.01); *C10N 2020/02* (2013.01);
(Continued)

(58) Field of Classification Search
CPC ............ C10M 171/02; C10M 2020/02; C10M 2030/02; C10M 2030/52; C10M 2040/252;
(Continued)

(56) References Cited

FOREIGN PATENT DOCUMENTS

| | | | |
|---|---|---|---|
| CN | 111542717 | A | 8/2020 |
| EP | 1298190 | A1 | 4/2003 |

(Continued)

OTHER PUBLICATIONS

Wärtsilä Corporation, "Wärtsilä Technical Journal", Jan. 1, 2012.

(Continued)

*Primary Examiner* — James C Goloboy
(74) *Attorney, Agent, or Firm* — EIP US LLP

(57) ABSTRACT

A method comprising providing a first fluid, second fluid, and third fluid having a first kinematic viscosity and a first BN, a second kinematic viscosity and a second BN, and a third kinematic viscosity and a third BN respectively, obtaining data identifying (i) a target kinematic viscosity of a cylinder oil to be produced, (ii) a target BN of the cylinder oil to be produced, and (iii) the kinematic viscosity and the BN of each of the first, second, and third fluids. Based on at least the identified kinematic viscosity and BN, the method comprises determining a ratio of first, second, and third fluid to produce a cylinder oil having a kinematic viscosity corresponding to the target kinematic viscosity and/or a BN corresponding to the target BN, and blending the first, second, and third fluids in the determined ratio to produce the cylinder oil.

9 Claims, 4 Drawing Sheets

(51) Int. Cl.

| | |
|---|---|
| ***C10N 30/00*** | (2006.01) |
| ***C10N 30/02*** | (2006.01) |
| ***C10N 40/25*** | (2006.01) |
| ***C10N 70/00*** | (2006.01) |
| ***F01M 9/02*** | (2006.01) |

(52) U.S. Cl.
CPC ...... *C10N 2030/02* (2013.01); *C10N 2030/52* (2020.05); *C10N 2040/252* (2020.05); *C10N 2070/00* (2013.01); *F16N 2200/12* (2013.01); *F16N 2210/06* (2013.01)

(58) Field of Classification Search
CPC .. C10M 2070/00; F01M 9/02; F16N 2200/12; F16N 2210/06
See application file for complete search history.

(56) References Cited

FOREIGN PATENT DOCUMENTS

| | | | | |
|---|---|---|---|---|
| EP | 1640442 A1 | | 3/2006 | |
| EP | 2497817 A1 | | 9/2012 | |
| EP | 2767578 A1 | | 8/2014 | |
| WO | 2006014866 A1 | | 2/2006 | |
| WO | 2007044909 A1 | | 4/2007 | |
| WO | 2011042412 A1 | | 4/2011 | |
| WO | 2016070002 A1 | | 5/2016 | |
| WO | WO-2017032383 A1 | * | 3/2017 | .......... C10M 177/00 |
| WO | WO-2017067561 A1 | * | 4/2017 | ............. F01M 11/10 |
| WO | 2017080563 A1 | | 5/2017 | |
| WO | 2018069460 A1 | | 4/2018 | |
| WO | 2019086398 A1 | | 5/2019 | |

OTHER PUBLICATIONS

Wärtsilä Corporation, "Warsila Technical Bullitin RT-113", "Sulhur-dependent cylinder oil feed rate", Apr. 10, 2012.
Woodyard, Doug "A Complex Future for Cylinder Oils, Marine Propulsion", System and cylinder oils for two-strokes, Oct. 1, 2011.
Maersk Group, "Appendix 4B_BOB_Laboratory evaluation case study" Case study: Variable Base Number (BN) Cylinder Oil Blended cylinder oil laboratory evaluation, Sea Mate Blending on Board, Feb. 16, 2015.
ASTM International, "Standard Test Method for Base Number of Petroleum Products", Base Number of Petroleum Products by Potentiometric Perchloric Acid Titration, Aug. 21, 2019.
Man Diesel, "Service Letter SL09-507HRR Cylinder Lubrication Update", Apr. 1, 2009.
Cimac, "Guildlines for diesel engines lubricants—oil degradation", The International Council on Combustion Engines, Nov. 22, 2004.
Man Diesel, "Sea mate Onboard Blending and Fluid Analysis Systems", May 2009.
Mortier et al, "Chemistry and Technology of Lubricants", 3rd Edition, Jan. 1, 2010.
Man B&W Diesel, "Moves Towards Intelligent Cylinder Lubrication", Apr. 2, 2002.
Castrol Marine, "Castrol aligned with MAN on Cylinder oils Concerns", Nov. 2012.
Product data sheet for Mobilgard 300, Aug. 2018.
Product data sheet for castrol CDX 30, Oct. 9, 2014.
Product data sheet for Shell Melina S Oil, Sep. 3, 2019.
Chevron, "Product Data Sheet Vertitas 800 Marine SAE 30 and 20", Jan. 2008.
Lukoil Company, "Product Information Sheet_NAVIGO 6 SO", Feb. 1, 2010.
Lukoil Company, "Product Information Sheet_NAVIGO 6 CO", Oct. 1, 2015.
Maersk Fluid Technology, "Sea-Mate Blending on Board", May 16, 2012.
International Search Report and Written Opinion dated Apr. 25, 2022 for International PCT Patent Application No. PCT/EP2022/053288.
Denmark Technical Examination and Search report dated Jun. 16, 2021, for Denmark Application No. PA202100158.
Taiwan Office Action dated Nov. 8, 2022 for Taiwan Application No. 111105152.

* cited by examiner

PRODUCTION OF CYLINDER OIL

CROSS-REFERENCE TO RELATED APPLICATIONS

This application is a continuation under 35 U.S.C. § 120 of International Application No. PCT/EP2022/053288, filed Feb. 10, 2022 which claims priority to Denmark Application No. PA202100158, filed Feb. 11, 2021, under 35 U.S.C. § 119(a). Each of the above-referenced patent applications is incorporated by reference in its entirety.

BACKGROUND

Field of the Invention

The present invention relates to a method for producing a cylinder oil for a marine reciprocating internal combustion engine, a method of operating a marine reciprocating internal combustion engine, an apparatus for the preparation of a cylinder oil, a non-transitory computer-readable storage medium, and a marine vessel comprising the apparatus for the preparation of a cylinder oil.

Marine vessels, such as container ships, have engines that are powered by heavy fuel oil or the like. Fuel consumption is the largest contributor to the daily running cost of marine vessels. Moreover, the amount of fuel consumed directly corresponds to the amount of pollutants generated (e.g. carbon dioxide ($CO_2$), nitrogen oxides ($NO_x$) and/or sulfur oxides ($SO_x$)). Fuel consumption is influenced by the efficiency of the operation of the engine and/or the speed at which the engine is operated.

Components of engines of marine vessels require lubrication during operation. The effectiveness of the lubrication will affect the efficiency of operation of the engine, and so in turn the amount of fuel consumed during operation of the engine. Friction losses in the engine can be reduced with appropriate lubrication.

Cylinder oil is used for the lubrication of cylinders in marine reciprocating internal combustion engines. Cylinder oil has various functions, including reducing mechanical wear of the piston, piston ring, and cylinder liner by forming an oil film between the piston and/or the piston ring and the cylinder liner, thereby reducing friction between the surfaces.

The ability to form an oil film having suitable lubrication properties between the piston and/or the piston ring and the cylinder liner is at least partially dependent on the viscosity of the cylinder oil. Cylinder oils having a higher kinematic viscosity will typically provide a thicker oil film between surfaces; cylinder oils having a lower kinematic viscosity typically provide a thinner film. However, due to variations in engine operation such as engine load, the required kinematic viscosity of the cylinder oil for lubricating the cylinder may vary during operation of the engine.

A further function of cylinder oil is to reduce corrosion of the material of the piston and the material of the liner by neutralising sulfur acids formed by the combustion of sulfur-containing fuel. The ability to reduce corrosion of the piston and the cylinder liner is at least partially dependent on the alkalinity of the cylinder oil, referred to as the Base Number (BN) of the cylinder oil. The BN is typically expressed in terms of milligrams of potassium hydroxide per gram of oil (mg KOH/g). For marine applications, cylinder oils typically have a BN of from 25 to 140, depending on the sulfur content of the fuel used to power the engine. However, due to variations in sulfur content of fuel or engine load, the required BN of the cylinder oil may vary during operation of the engine.

Marine vessels can be provided with a blending system to produce on-board cylinder oils of varying alkalinity in response to the varying requirements during operation of the engine. The process is dictated by the target BN of the required cylinder oil, and does not take into account a target kinematic viscosity.

Marine vessels are typically loaded with lubricating oils on shore, and it is not possible to obtain lubricating oils having differing properties during a voyage. Depending on the fluids available for blending to produce cylinder oils on-board, it may not always be possible to provide a cylinder oil having a target BN (e.g. a BN ideal for the current operating conditions) and a target viscosity (e.g. a kinematic viscosity ideal for the current operating conditions) simultaneously.

Embodiments of the present invention aim to enable reduction in fuel consumption and the amount of pollutants generated during operating of a marine reciprocating internal combustion engine while addressing the aforementioned problems.

SUMMARY

A first aspect of the present invention provides a method of producing a cylinder oil for a marine reciprocating internal combustion engine, the method comprising: providing a first fluid having a first kinematic viscosity and a first BN; providing a second fluid having a second kinematic viscosity and a second BN; providing a third fluid having a third kinematic viscosity and a third BN; obtaining data identifying a target kinematic viscosity of a cylinder oil to be produced; obtaining data identifying a target BN of the cylinder oil to be produced; obtaining data identifying the kinematic viscosity and the BN of each of the first fluid, the second fluid, and the third fluid; based on at least the kinematic viscosity and the BN of each of the first fluid, the second fluid, and the third fluid, determining a ratio of first fluid, second fluid, and third fluid to produce a cylinder oil having a kinematic viscosity corresponding to the target kinematic viscosity and/or a BN corresponding to the target BN; and blending the first fluid, second fluid, and third fluid in the determined ratio to produce the cylinder oil.

The inventors have identified that the method described hereinabove allows for production of a cylinder oil having a kinematic viscosity and a BN in response to information provided to the controller, e.g. parameters of available fluids for blending. By taking into account both the viscosity and the BN of the fluids to be blended, the inventors have devised a method in which a cylinder oil is produced having at least one of a kinematic viscosity corresponding to a target kinematic viscosity and a BN corresponding to a target BN.

Moreover, in examples, the method allows for production of a cylinder oil having desirable properties even if both a target kinematic viscosity and target BN cannot be achieved from the available fluids for blending to provide a cylinder oil. For example, if it is not possible to blend available fluids in such a way as to provide a cylinder oil having both the target kinematic viscosity and the target BN, provided herein are examples wherein a cylinder oil is provided having at a kinematic viscosity corresponding to a target kinematic viscosity and a BN approximate to the target BN based on the properties of the available blendable fluids, or a BN corresponding to a target BN and a kinematic viscosity approximate to the target kinematic viscosity based on the properties of the available blendable fluids.

Optionally, the determining the ratio of first fluid, second fluid, and third fluid comprises: based on the target kinematic viscosity of the cylinder oil to be produced, the kinematic viscosity of each of the first fluid, second fluid, and third fluid, and the BN of each of the first fluid, second fluid, and third fluid, determining a BN range for the cylinder oil having an upper limit and a lower limit.

Advantageously, in these examples, the target kinematic viscosity is deemed to be of higher importance than the target BN (e.g. kinematic viscosity is selected by a user to take precedence over BN). Accordingly, the method is carried out such that the produced cylinder oil will have a kinematic viscosity corresponding to the target kinematic viscosity and a BN corresponding to or approximate to the target BN, depending on the properties of the fluids available for blending.

Optionally, the determining the ratio of first fluid, second fluid, and third fluid further comprises determining that the target BN of the cylinder oil is equal to the upper limit or lower limit of the determined BN range, or is between the upper limit and lower limit of the determined BN range, and determining a ratio of first fluid, second fluid, and third fluid which corresponds to the target kinematic viscosity and the target BN.

Advantageously, in these examples, it is determined that it is possible to blend the available fluids to provide a cylinder oil having a kinematic viscosity corresponding to the target kinematic viscosity, and a BN corresponding to the target BN. Accordingly, the method comprises blending the available fluids such that a cylinder oil having these properties is produced.

Optionally, the determining the ratio of first fluid, second fluid, and third fluid further comprises determining that the target BN of the cylinder oil is greater than the determined upper limit of the determined BN range, and determining a ratio of first fluid, second fluid, and third fluid which corresponds to the target kinematic viscosity and the upper limit of the determined BN range.

In these examples, it is determined that it is not possible to blend the available fluids to provide a cylinder oil having a kinematic viscosity corresponding to the target kinematic viscosity, and a BN corresponding to the target BN. For example, it is only possible to provide a cylinder oil having a BN greater than the target BN using the available fluids for blending. However, advantageously, the method provides a cylinder oil having a kinematic viscosity corresponding to the target kinematic viscosity and a BN approximate to the target BN.

Optionally, the determining the ratio of first fluid, second fluid, and third fluid further comprises determining that the target BN of the cylinder oil is lower than the determined lower limit of the determined BN range, and determining a ratio of first fluid, second fluid, and third fluid which corresponds to the target kinematic viscosity and the lower limit of the determined BN range.

In these examples, it is determined that it is not possible to blend the available fluids to provide a cylinder oil having a kinematic viscosity corresponding to the target kinematic viscosity, and a BN corresponding to the target BN. For example, it is only possible to provide a cylinder oil having a BN less than the target BN using the available fluids for blending. However, advantageously, the method provides a cylinder oil having a kinematic viscosity corresponding to the target kinematic viscosity and a BN approximate to the target BN.

Optionally, the determining the ratio of first fluid, second fluid, and third fluid comprises: based on the target BN of the cylinder oil to be produced, the kinematic viscosity of each of the first fluid, second fluid, and third fluid, and the BN of each of the first fluid, second fluid, and third fluid, determining a kinematic viscosity range for the cylinder oil having an upper limit and a lower limit.

Advantageously, in these examples, the target BN is deemed to be of higher importance than the target kinematic viscosity (e.g. BN is selected by a user to take precedence over kinematic viscosity). Accordingly, the method is carried out such that the produced cylinder oil will have a BN corresponding to the target BN and a kinematic viscosity corresponding to or approximate to the target BN, depending on the properties of the fluids available for blending.

Optionally, the determining the ratio of first fluid, second fluid, and third fluid further comprises determining that the target kinematic viscosity of the cylinder oil is equal to the upper limit or lower limit of the determined kinematic viscosity range, or is between the upper limit and lower limit of the determined kinematic viscosity range, and determining a ratio of first fluid, second fluid, and third fluid which corresponds to the target kinematic viscosity and the target BN.

Advantageously, in these examples, it is determined that it is possible to blend the available fluids to provide a cylinder oil having a kinematic viscosity corresponding to the target kinematic viscosity, and a BN corresponding to the target BN. Accordingly, the method comprises blending the available fluids such that a cylinder oil having these properties is produced.

Optionally, the determining the ratio of first fluid, second fluid, and third fluid further comprises determining that the target kinematic viscosity of the cylinder oil is greater than the determined upper limit of the determined kinematic viscosity range, and determining a ratio of first fluid, second fluid, and third fluid which corresponds to the target BN and the upper limit of the determined kinematic viscosity range.

In these examples, it is determined that it is not possible to blend the available fluids to provide a cylinder oil having a kinematic viscosity corresponding to the target kinematic viscosity, and a BN corresponding to the target BN. For example, it is only possible to provide a cylinder oil having a kinematic viscosity greater than the target kinematic viscosity using the available fluids for blending. However, advantageously, the method provides a cylinder oil having a BN corresponding to the target BN and a kinematic viscosity approximate to the target kinematic viscosity.

Optionally, the determining the ratio of first fluid, second fluid, and third fluid further comprises determining that the target kinematic viscosity of the cylinder oil is lower than the determined lower limit of the determined kinematic viscosity range, and determining a ratio of first fluid, second fluid, and third fluid which corresponds to the target BN and the lower limit of the determined kinematic viscosity range.

In these examples, it is determined that it is not possible to blend the available fluids to provide a cylinder oil having a kinematic viscosity corresponding to the target kinematic viscosity, and a BN corresponding to the target BN. For example, it is only possible to provide a cylinder oil having a kinematic viscosity lower than the target kinematic viscosity using the available fluids for blending. However, advantageously, the method provides a cylinder oil having a kinematic viscosity corresponding to the target kinematic viscosity and a BN approximate to the target BN.

Optionally, the obtaining data identifying the target kinematic viscosity of the cylinder oil to be produced comprises determining a target kinematic viscosity based on an engine operation parameter and/or an engine condition parameter.

Optionally, the obtaining data identifying the target BN of the cylinder oil to be produced comprises determining a target BN based on an engine operation parameter and/or an engine condition parameter.

Optionally, the method is carried out offshore, such as on board a marine vessel. Advantageously, performing the method on board a marine vessel compared with on shore allows for adapting properties of the cylinder oil to meet the requirements of the engine during operation.

Optionally, the first fluid is a system oil. In examples, the system oil has a kinematic viscosity of from 10 to 15 $mm^2/s$ at 100° C. Typically, the system oil has a kinematic viscosity corresponding to SAE viscosity grade SAE 30; for example, the system oil has a kinematic viscosity of from 11 to 12 $mm^2/s$ at 100° C. In examples, the system oil is an at least partially used system oil, such as a used system oil. The use of a used system oil reduces the cost of operation of the engine. In other examples, the system oil is a fresh (virgin) oil. The system oil typically has a BN of from 5 to 30, such as 5 to 10. In examples, such as where the system oil is a fresh cylinder oil, the system oil has a BN from 5 to 8.

Optionally, the second fluid is an additive packet, fresh cylinder oil, or at least partially used cylinder oil. In examples, the second fluid is an additive package which comprises base oil and one or more additives, such as overbased and/or neutral detergents (metallic alkaline salts) and optionally other performance additives. In these examples, the additive package typically has a high kinematic viscosity (often from 50 to 200 $mm^2/s$ at 100° C., such as 100 $mm^2/s$ or greater) and a high BN (often from 150 to 400). In examples, the second fluid is a virgin cylinder oil (e.g. cylinder oil which has not yet been used to lubricate a piston and cylinder liner), and has a kinematic viscosity of from 16 to 21 $mm^2/s$ at 100° C., and a BN of from 15 to 145. In examples, the second fluid is a used cylinder oil (e.g. a cylinder oil which has at some point been used to lubricate a piston and cylinder liner).

Optionally, the third fluid is a base oil. In examples, the base oil has a kinematic viscosity of from 3 to 8 $mm^2/s$ at 100° C. Typically, the base oil has a kinematic viscosity corresponding to SAE viscosity grade SAE 20; for example, the base oil has a kinematic viscosity of from 4 to 7 $mm^2/s$ at 100° C. Advantageously, base oil is typically low cost, and therefore including base oil in the blending reduces the cost of producing a cylinder oil. The base oil typically has a BN of less than 1, such as less than 0.5, or less than 0.1.

Optionally, at least one of the first fluid, second fluid, or third fluid is an at least partially used oil, for example a used oil. Use of a used system oil reduces the cost of operation of the engine.

Optionally, at least one of the first fluid, second fluid, and third fluid is a monograde oil; for example, each of the first fluid, second fluid, and third fluid is a monograde oil. Optionally, at least one of the first fluid, second fluid, and third fluid is a multigrade oil; for example, each of the first fluid, second fluid, and third fluid is a multigrade oil.

Optionally, the cylinder oil is an all-loss cylinder oil.

Optionally, the produced cylinder oil has a kinematic viscosity equal to or less than 14 $mm^2/s$ at 100° C. The inventors have identified that providing a cylinder oil of reduced kinematic viscosity (e.g. below the minimum kinematic viscosity recommended by the engine manufacturer) allows for lubrication of a cylinder oil with reduced friction losses during operation of the engine. The lower viscosity of the cylinder oil means that a thinner oil film is formed between the piston and the cylinder liner, which leads to a reduction in hydrodynamic friction. The reduction in friction losses leads to reduced fuel consumption during operation of the engine, and thus a reduction in the amount of pollutants generated.

Surprisingly, the inventors have further identified that the reduced kinematic viscosity does not have a significant negative effect on the ability of the oil to control wear of the piston and/or cylinder liner, and in examples provides greater control of engine component wear. Thus, for the first time the inventors have provided a cylinder oil having low kinematic viscosity which can be reliably used in a marine reciprocating internal combustion engine.

All kinematic viscosities described herein are measured at a temperature of 100° C., unless otherwise stated. The kinematic viscosity of an oil at 100° C. can be expressed in centistokes (cSt). Accordingly, the cylinder oil having a kinematic viscosity equal to or less than 14 $mm^2/s$ at 100° C. is the same as 14 cSt. In examples, the cylinder oil has a kinematic viscosity equal to or less than 13.5 $mm^2/s$, or equal to or less than 13 $mm^2/s$, or equal to or less than 12.5 $mm^2/s$, or equal to or less than 10 $mm^2/s$. In examples, the cylinder oil has a kinematic viscosity equal to or greater than 8 $mm^2/s$, such as from 8 $mm^2/s$ to 14 $mm^2/s$, or from 8 $mm^2/s$ to 12.5 $mm^2/s$, or from 8 $mm^2/s$ to 10 $mm^2/s$.

Optionally, the produced cylinder oil has a kinematic viscosity corresponding to SAE Viscosity Grade SAE 40, or SAE 30, or SAE 20. The cylinder oil has any suitable viscosity index for use in lubricating the piston liner and piston rings in the cylinder of an engine. In examples, the cylinder oil has a viscosity index of from 59 to 120.

Optionally, the produced cylinder oil has a BN of from 15 to 160 mg KOH/g, or from 25 to 150 mg KOH/g, or from 40 to 140 mg KOH/g, or from 50 to 120 mg KOH/g.

A second aspect of the present invention provides a method of operating a marine reciprocating internal combustion engine, the method comprising: producing a cylinder oil by a method described hereinabove; and supplying the cylinder oil to a cylinder of the marine reciprocating internal combustion engine.

Optionally, the cylinder oil has a kinematic viscosity equal to or less than 14 $mm^2/s$ at 100° C. Surprisingly, the inventors have identified that safe operation of a marine internal reciprocating engine, such as a two-stroke crosshead engine, can be maintained with a cylinder oil having a viscosity below 14 $mm^2/s$.

Optionally, the kinematic viscosity of the cylinder oil is lower than the manufacturer's recommended minimum cylinder oil kinematic viscosity for the marine reciprocating internal combustion engine.

Optionally, the marine reciprocating internal combustion engine is operating at an engine load of 60% or less. For example, the engine may be operating at a speed significantly lower than the engine's maximum speed (sometimes referred to as "slow steaming"). In other examples, the marine reciprocating internal combustion engine is operating at an engine load greater than 60%, such as up to 70% or 80%.

Optionally, the marine reciprocating internal combustion engine is a two-stroke crosshead engine. In examples, the two-stroke crosshead engine is a low-speed engine.

A third aspect of the present invention provides an apparatus for the preparation of a cylinder oil comprising: a blender; a first container for containing a first fluid having a first kinematic viscosity and a first BN, the first container in selectable fluid communication with the blender; a second container for containing a second fluid having a second kinematic viscosity and a second BN; the second container in selectable fluid communication with the blender; a third container for containing a third fluid having a third kinematic viscosity and a third BN, the third container in selectable fluid communication with the blender; and a controller configured to: obtain data identifying a target kinematic viscosity of the cylinder oil to be produced; obtain data identifying a target BN of the cylinder oil to be produced; obtain data identifying the kinematic viscosity and BN of each of the first fluid, the second fluid, and the third fluid; determine a ratio of first fluid, second fluid, and third fluid to produce the cylinder oil having a kinematic viscosity corresponding to the target kinematic viscosity and/or a BN corresponding to the target BN; and cause the blender to blend the first fluid, second fluid, and third fluid in the determined ratio to produce the cylinder oil.

Optionally, the controller is configured to selectively operate in a first mode (e.g. a "viscosity mode") and a second mode (e.g. "BN mode").

Optionally, the controller is configured to operate in the first mode or the second mode based on user input received from, for example, a user input device. In examples, the user input device is part of a user interface.

Optionally, the controller is further configured to operate in a third mode of operation. Optionally, the controller is configured to operate in the third mode based on user input received from, for example, an input device.

Optionally, when operated in the first mode, in determining the ratio of first fluid, second fluid, and third fluid, the controller is configured to: based on the target kinematic viscosity of the cylinder oil to be produced, the kinematic viscosity of each of the first fluid, second fluid, and third fluid, and the BN of each of the first fluid, second fluid, and third fluid, determine a BN range for the cylinder oil having an upper limit and a lower limit.

In examples, the determining the BN range for the cylinder oil comprises solving the following equations:

$$BN_{C1} = \frac{Vi_2BN_3 + Vi_{C(T)}BN_2 - Vi_{C(T)}BN_3 - Vi_3BN_2}{Vi_2 - Vi_3} \quad \text{Equation (1)}$$

$$BN_{C2} = \frac{Vi_2BN_1 + Vi_{C(T)}BN_2 - Vi_{C(T)}BN_1 - Vi_1BN_2}{Vi_2 - Vi_1} \quad \text{Equation (2)}$$

$$BN_{C3} = \frac{Vi_{C(T)}BN_1 - Vi_{C(T)}BN_3 + Vi_1BN_3 - Vi_3BN_1}{Vi_1 - Vi_3} \quad \text{Equation (3)}$$

wherein $BN_{C1}$ is a first calculated BN for the cylinder oil, $BN_{C2}$ is a second calculated BN for the cylinder oil, $BN_{C3}$ is a third calculated BN for the cylinder oil, $Vi_{C(T)}$ is a value corresponding to the target kinematic viscosity (e.g. the value is a value proportional to the target kinematic viscosity, or the value is equal to the target kinematic viscosity of the cylinder oil to be produced), $Vi_1$ is a value corresponding to the kinematic viscosity of the first fluid (e.g. the value is a value proportional to the kinematic viscosity of the first fluid, or the value is equal to the kinematic viscosity of the first fluid), $Vi_2$ is a value corresponding to the kinematic viscosity of the second fluid (e.g. the value is a value proportional to the kinematic viscosity of the second fluid, or the value is equal to the kinematic viscosity of the second fluid), $Vi_3$ is a value corresponding to the kinematic viscosity of the third fluid (e.g. the value is a value proportional to the kinematic viscosity of the third fluid, or the value is equal to the kinematic viscosity of the third fluid), $BN_1$ is the BN of the first fluid or a value corresponding to the BN of the first fluid (e.g. proportional to the BN of the first fluid), $BN_2$ is the BN of the second fluid or a value corresponding to the BN of the second fluid (e.g. proportional to the BN of the second fluid), and $BN_3$ is the BN of the third fluid or a value corresponding to the BN of the third fluid (e.g. proportional to the BN of the third fluid).

In examples, the determining the range further comprises determining the highest value of $BN_{C1}$, $BN_{C2}$, and $BN_{C3}$, and setting the determined highest value as the upper limit of the determined BN range. In examples, the determining the range further comprises determining the second-highest value of $BN_{C1}$, $BN_{C2}$, and $BN_{C3}$, and setting the determined second-highest value as the lower limit of the determined BN range.

Optionally, the controller is configured to determine that the target BN of the cylinder oil is equal to the upper limit or lower limit of the determined BN range, or is between the upper limit and lower limit of the determined BN range. Thus, in determining the ratio of first fluid, second fluid, and third fluid, the controller is configured to determine a ratio of first fluid, second fluid, and third fluid which corresponds to the target kinematic viscosity and the target BN (e.g. corresponds to both $Vi_{C(T)}$ and $BN_{C(T)}$, where $BN_{C(T)}$ is the target BN of the cylinder oil to be produced).

Optionally, the controller is configured to determine that the target BN of the cylinder oil is greater than the determined upper limit of the determined BN range. Thus, in determining the ratio of first fluid, second fluid, and third fluid, the controller is configured to determine a ratio of first fluid, second fluid, and third fluid which corresponds to the target kinematic viscosity and the upper limit of the determined BN range (e.g. corresponds to $Vi_{C(T)}$ and the determined highest value of $BN_{C1}$, $BN_{C2}$, and $BN_{C3}$).

Optionally, the controller is configured to determine that the target BN of the cylinder oil is lower than the determined lower limit of the determined BN range. Thus, in determining the ratio of first fluid, second fluid, and third fluid, the controller is configured to determine a ratio of first fluid, second fluid, and third fluid which corresponds to the target kinematic viscosity and the lower limit of the determined BN range (e.g. corresponds to $Vi_{C(T)}$ and the determined second-highest value of $BN_{C1}$, $BN_{C2}$, and $BN_{C3}$).

Optionally, when operated in the second mode, in determining the ratio of first fluid, second fluid, and third fluid, the controller is configured to: based on the target BN of the cylinder oil to be produced, the kinematic viscosity of each of the first fluid, second fluid, and third fluid, and the BN of each of the first fluid, second fluid, and third fluid, determine a kinematic viscosity range for the cylinder oil having an upper limit and a lower limit.

In examples, the determining the kinematic viscosity range for the cylinder oil comprises solving the following equations:

$$Vi_{C1} = -\frac{Vi_3BN_2 - Vi_3BN_{C(T)} - Vi_2BN_3 + Vi_2BN_{C(T)}}{BN_3 - BN_2} \quad \text{Equation (4)}$$

$$Vi_{C2} = -\frac{Vi_2BN_1 - Vi_2BN_{C(T)} - Vi_1BN_2 + Vi_1BN_{C(T)}}{BN_2 - BN_1} \quad \text{Equation (5)}$$

$$Vi_{C3} = -\frac{Vi_3BN_1 - Vi_3BN_{C(T)} - Vi_1BN_3 + Vi_1BN_{C(T)}}{BN_3 - BN_1} \quad \text{Equation (6)}$$

wherein $Vi_{C1}$ is a first calculated value corresponding to a kinematic viscosity for the cylinder oil (e.g. the value is a value proportional to a first kinematic viscosity for the cylinder oil), $Vi_{C2}$ is a second calculated value corresponding to a kinematic viscosity for the cylinder oil (e.g. the value is a value proportional to a second kinematic viscosity for the cylinder oil), $Vi_{C3}$ is a third calculated value corresponding to a kinematic viscosity for the cylinder oil (e.g. the value is a value proportional to a third kinematic viscosity for the cylinder oil), and $BN_{C(T)}$ is the target BN of the cylinder oil to be produced. The other symbols employed in Equations 4 to 6 have the same meaning as those used in Equations 1 to 3 hereinabove.

In examples, the determining the range further comprises determining the lowest value of $Vi_{C1}$, $Vi_{C2}$, and $Vi_{C3}$, and setting the determined lowest value as the lower limit of the determined kinematic viscosity range. In examples, the determining the range further comprises determining the second-lowest value of $Vi_{C1}$, $Vi_{C2}$, and $Vi_{C3}$, and setting the determined second-lowest value as the upper limit of the determined kinematic viscosity range.

Optionally, the controller is configured to determine that the target kinematic viscosity of the cylinder oil is equal to the upper limit or lower limit of the determined kinematic viscosity range, or is between the upper limit and lower limit of the determined kinematic viscosity range. Thus, in determining the ratio of first fluid, second fluid, and third fluid, the controller is configured to determine a ratio of first fluid, second fluid, and third fluid which corresponds to the target kinematic viscosity and the target BN (e.g. corresponds to both $Vi_{C(T)}$ and $BN_{C(T)}$).

Optionally, the controller is configured to determine that the target kinematic viscosity of the cylinder oil is greater than the determined upper limit of the determined kinematic viscosity range. Thus, in determining the ratio of first fluid, second fluid, and third fluid, the controller is configured to determine a ratio of first fluid, second fluid, and third fluid which corresponds to the target BN and the upper limit of the determined kinematic viscosity range (e.g. corresponds to $BN_{C(T)}$ and the determined second-lowest value of $Vi_{C1}$, $Vi_{C2}$, and $Vi_{C3}$).

Optionally, the controller is configured to determine that the target kinematic viscosity of the cylinder oil is lower than the determined lower limit of the determined kinematic viscosity range. Thus, in determining the ratio of first fluid, second fluid, and third fluid, the controller is configured to determine a ratio of first fluid, second fluid, and third fluid which corresponds to the target BN and the lower limit of the determined kinematic viscosity range (e.g. corresponds to $BN_{C(T)}$ and the determined lowest value of $Vi_{C1}$, $Vi_{C2}$, and $Vi_{C3}$).

Optionally, the controller is configured to operate in the first mode of operation described hereinabove without necessarily also being configured to operate in the second mode of operation (e.g. the controller is configured to operate in "viscosity mode", and is not necessarily also configured to alternatively operate in "BN mode"). Optionally, the controller is configured to operate in the second mode of operation described hereinabove without necessarily also being configured to operate in the first mode of operation (e.g. the controller is configured to operate in "BN" mode, and is not necessarily also configured to alternatively operate in "viscosity mode").

Optionally, the controller is communicatively connected to one or more sensors for sensing an engine operation parameter, an engine condition parameter, and/or a fluid condition parameter.

Optionally, the engine operation parameter, engine condition parameter, or fluid condition parameter is at least one of: fuel sulfur-content; engine load; engine speed; relative air humidity; cylinder ferrous wear emission; cylinder total iron content, fluid viscosity (for first fluid, second fluid, third fluid, and/or produced cylinder oil), fluid BN ((for first fluid, second fluid, third fluid, and/or produced cylinder oil), fluid temperature (for first fluid, second fluid, third fluid, and/or produced cylinder oil), cylinder lubricant residual BN; and cylinder oil liner temperature.

Optionally, the controller is communicatively connected to an input device, such as a user input device, for a user to input data such as fluid parameters (e.g. kinematic viscosity and/or BN of a first, second, or third fluid), target cylinder oil parameters (e.g. target kinematic viscosity and/or target BN), engine operating parameters (as discussed above), engine condition parameters (as discussed above), and mode selection (e.g. instructing the controller to operate in a first mode of operation—"viscosity mode"—or a second mode of operation—"BN mode".

A fourth aspect of the present invention provides a non-transitory computer-readable storage medium storing instructions that, when executed by a processor, cause the processor to: obtain data identifying a target kinematic viscosity of a cylinder oil to be produced; obtain data identifying a target BN of the cylinder oil to be produced; obtain data identifying the kinematic viscosity and BN of each of a first fluid, a second fluid, and a third fluid; determine a ratio of first fluid, second fluid, and third fluid to produce the cylinder oil having a kinematic viscosity corresponding to the target kinematic viscosity and/or a BN corresponding to the target BN; and generate an instruction for a blender to blend the first fluid, second fluid, and third fluid in the determined ratio.

Optionally, the non-transitory computer-readable storage medium stores instructions that, when executed by a processor, cause the processor to carry out any of the methods described hereinabove.

A fifth aspect of the present invention provides a marine vessel comprising the apparatus described hereinabove with respect to the third aspect and/or the non-transitory computer-readable storage medium described hereinabove with respect to the fourth aspect.

Optionally, the marine vessel is a cargo vessel such as a container ship, a tanker, a dry-bulk carrier, or a reefer ship. Optionally, the marine vessel is a passenger vessel.

Optionally, the marine vessel is a container ship.

Features described in relation to one aspect of the invention are explicitly disclosed in combination with any and all other aspects to the extent that they are compatible.

Further features and advantages of the invention will become apparent from the following description of preferred embodiments of the invention, given by way of example only, which is made with reference to the accompanying drawings.

BRIEF DESCRIPTION OF THE DRAWINGS

Embodiments of the invention will now be described, by way of example only, with reference to the accompanying drawings, in which.

DETAILED DESCRIPTION

Figure 1:
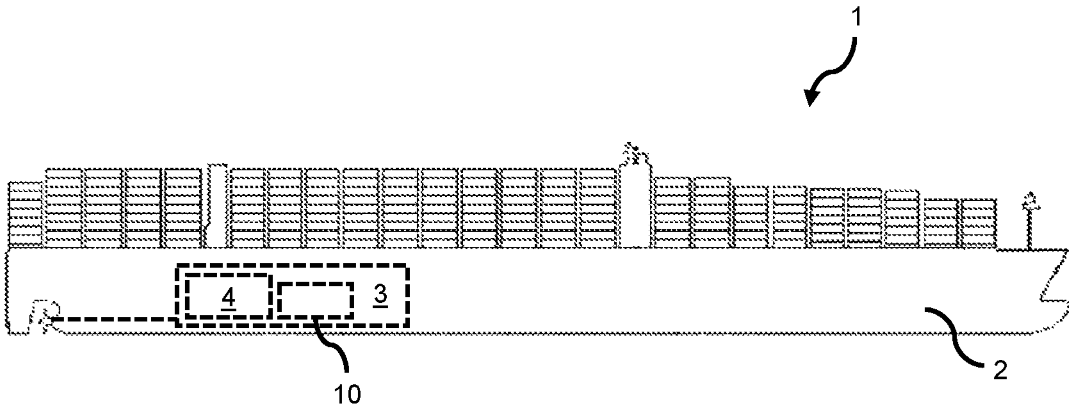
FIG. 1 shows a schematic side view of an example of a marine vessel according to an embodiment of the present invention.

FIG. 1 shows a schematic side view of an example of a marine vessel according to an example. In this embodiment, the vessel is a container ship 1. In other embodiments, the marine vessel may be another form of cargo vessel, such as a tanker, a dry-bulk carrier or a reefer ship, or a passenger vessel or any other marine vessel that uses cylinder oil.

The marine vessel 1 has a hull 2 and one or more engine rooms 3 inside the hull 2. The marine vessel 1 is powered by one or more large internal combustion engines 4, such as four-stroke or two-stroke self-igniting combustion engines 4, located in an engine room 3. The engine(s) 4 drive(s) a propulsion mechanism (such as one or more propellers). The vessel 1 may also comprise one or more auxiliary engines (known as generator sets) the provide power and/or heat for various consumers of power aboard the vessel 1. The vessel 1 also comprises an apparatus for preparing cylinder oil 10, 20 for supplying cylinder oil to the engine(s) 4. The apparatus 10, 20 may be any apparatus for preparing cylinder oil described herein as an embodiment of the present invention, such as that shown in FIG. 2 or that shown in FIG. 3.

The engine 4 is a marine two-stroke internal combustion engine. In the example shown in FIG. 1, the engine 4 is powered by marine heavy fuel oil. In other examples (not shown), the marine two-stroke internal combustion engine is powered by a fuel other than heavy fuel oil, such as marine light oil, marine diesel oil, marine gas oil, liquid natural gas, liquid petroleum gas, biofuel, methanol, ethanol, ammonia, hydrogen, methane, biomethane, or a combination thereof. In these examples, the fuel can be natural or synthetic. The two-stroke internal combustion engine is any suitable engine, such as a diesel uniflow engine, or an Otto cycle engine. The skilled person will be familiar with the components and systems of a marine vessel 1, and so further detailed discussion thereof is omitted for brevity.

Figure 2:
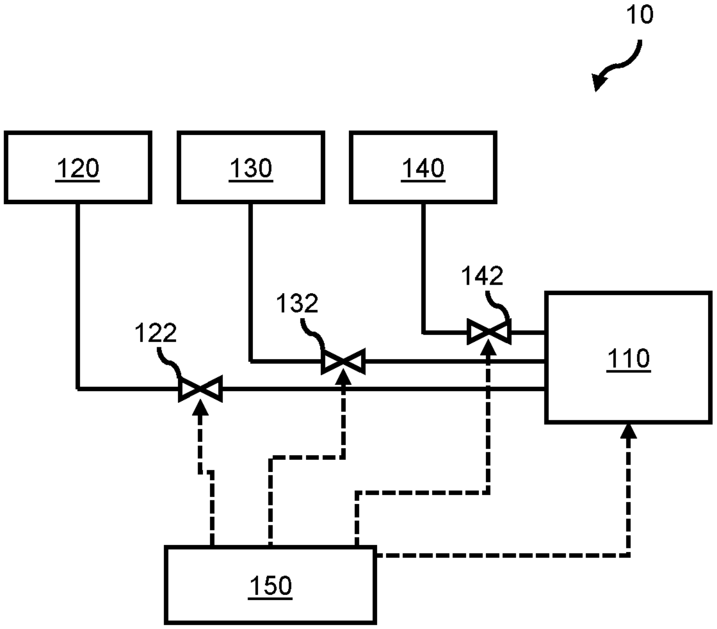
FIG. 2 shows a schematic view of an example apparatus for the preparation of a cylinder oil according to an embodiment of the present invention.

FIG. 2 shows a schematic view of an apparatus 10 for preparing a cylinder oil according to an example. The apparatus 10 is for supplying cylinder oil to the cylinder liner of a cylinder of an engine, such as an engine 4 of marine vessel shown in FIG. 1 or any variants thereof described herein.

Broadly speaking, the apparatus 10 comprises a blender 110 for blending fluids to provide a cylinder oil; a first container 120 for containing a first fluid having a first kinematic viscosity and a first BN, the first container 120 in selectable fluid communication with the blender 110; a second container 130 for containing a second fluid having a second kinematic viscosity and a second BN, the second container 130 in selectable fluid communication with the blender 110; a third container 140 for containing a third fluid having a third kinematic viscosity and a third BN, the third container 140 in selectable fluid communication with the blender 110; and a controller 150. The controller 150 is configured to obtain data identifying a target kinematic viscosity of the cylinder oil to be produced; obtain data identifying a target BN of the cylinder oil to be produced; obtain data identifying the kinematic viscosity and BN of each of the first fluid, the second fluid, and the third fluid; determine a ratio of first fluid, second fluid, and third fluid to produce the cylinder oil having a kinematic viscosity corresponding to the target kinematic viscosity and/or a BN corresponding to the target BN; and cause the blender to blend the first fluid, second fluid, and third fluid in the determined ratio to produce the cylinder oil.

More specifically, in FIG. 2, the first container 120 is connected to the blender 110 via a valve 122 through which the first fluid flows from the first container 120 to the blender 110. The valve is for controlling the flow of first fluid from the first container 120 to the blender 110. For example, the valve is closable to prevent or hinder flow of the first fluid from the first container 120 to the blender 110, and openable to allow flow of the first fluid from the first container 120 to the blender 110. Thus, the first container 120 is in selectable fluid communication with the blender 110. Optionally, the valve 122 can be operated to allow a restricted flow of first fluid from the first container 120 to the blender 110 (e.g. the valve 122 can be "partially" closed, or "partially" opened). The valve is operable manually, or via a controller, described further herein. In other examples (not shown), the first container 120 is in selectable fluid communication with the blender 110 via a pump for pumping first fluid from the first container 120 to the blender 110.

In examples, the first container 120 contains first fluid, such as system oil. A system oil is oil suitable for use in a crankcase lubrication system of a slow speed two-stroke marine diesel engines. The system oil may be a virgin oil (e.g. has not been used in a crankcase lubrication system), in which case the first container 120 is typically a storage tank for storing virgin system oil. Alternatively, the system oil is an at least partially used system oil, e.g. a system oil which has been circulated around a crankcase lubrication system. In which case, in examples the first container 120 is a storage tank for storing used system oil. Such a used system oil storage tank is, in examples, fluidly connected with the crankcase to receive used system oil from the crankcase. In examples, the used system oil storage tank is connected to the crankcase via a pump to pump used system oil from the crankcase to the used system oil tank. In other examples where the system oil is an at least partially used system oil, the first container 120 is within, or is, the crankcase of the engine. For example, the first container 120 is a sump in the crankcase of the engine.

In FIG. 2 the second container 130 is connected to the blender 110 via a valve 132 through which the second fluid flows from the second container 130 to the blender 110. More specifically, the valve is for controlling the flow of second fluid from the second container 130 to the blender 110. For example, the valve may be closable to prevent or hinder flow of the second fluid from the second container 130 to the blender 110, and openable to allow flow of the second fluid from the second container 130 to the blender 110. Thus, the second container 130 is in selectable fluid communication with the blender 110. Optionally, the valve 132 can be operated to allow a restricted flow of second fluid from the second container 130 to the blender 110 (e.g. the valve 132 can be "partially" closed, or "partially" opened). The valve 132 is operable manually, or via a controller, described further herein. In other examples (not shown), the second container 130 is connected to the blender 110 via a pump for pumping second fluid from the second container 130 to the blender 110.

In examples, the second container 130 contains second fluid, such as an additive package, virgin cylinder oil, or at least partially used cylinder oil (e.g. cylinder oil which has been delivered to a cylinder for lubricating the piston and cylinder liner, and subsequently collected).

Where the second fluid is an additive package, the second container 130 is a storage tank for storing additive package. An additive package typically comprises base oil and one or more additives, such as overbased and/or neutral detergents (metallic alkaline salts) and optionally other performance additives. The additive package typically has a high kinematic viscosity (often from 50 to 200 $mm^2/s$ at 100° C., such as 100 $mm^2/s$ or greater) and a high BN (often from 150 to 400).

Where the second fluid is a virgin cylinder oil (e.g. cylinder oil which has not yet been used to lubricate a piston and cylinder liner), the second container 130 is a storage tank for storing cylinder oil. The virgin cylinder oil typically has a kinematic viscosity of from 16 to 21 $mm^2/s$, and a BN of from 15 to 145.

Where the second fluid is a used cylinder oil (e.g. a cylinder oil which has at some point been used to lubricate a piston and cylinder liner), the second container 130 is, in some examples, a storage tank for storing used cylinder oil. In other examples, used cylinder oil is alternatively or additionally provided to the blender directly from the cylinder. In which case, the second container 130 is a cylinder of the engine.

In FIG. 2 the third container 140 is connected to the blender 110 via a valve 142 through which the third fluid flows from the third container 140 to the blender 110. More specifically, the valve is for controlling the flow of third fluid from the third container 140 to the blender 110. For example, the valve may be closable to prevent or hinder flow of the third fluid from the third container 140 to the blender 110, and openable to allow flow of the third fluid from the third container 140 to the blender 110. Thus, the third container 140 is in selectable fluid communication with the blender 110. Optionally, the valve 142 can be operated to allow a restricted flow of third fluid from the third container 140 to the blender 110 (e.g. the valve 142 can be "partially" closed, or "partially" opened). The valve 142 is operable manually, or via a controller, described further herein. In other examples (not shown), the third container 140 is connected to the blender 110 via a pump for pumping third fluid from the third container 140 to the blender 110.

In examples, the third container 140 contains third fluid, such as base oil. Where the third fluid is base oil, the third container 140 is a storage tank for storing base oil. A base oil is an oil typically suitable for combining with other components for providing a lubrication product. The base oil typically has a kinematic viscosity of from 4 to 7 $mm^2/s$. In examples, the base oil is a virgin base oil (e.g. has not been used to lubricate a machine component). In other examples, the base oil is a used or recycled base oil (e.g. has been used to lubricate a machine component, optionally having had additives and/or contaminants removed before supplying to the blender 110).

The apparatus 10 comprises a controller 150 for controlling the apparatus 10. In this example, the controller 150 is communicatively connected to, and for controlling, each of: the first valve 122 for controlling flow of first fluid from the first container 120 to the blender 110; the second valve 132 for controlling flow of second fluid from the second container 130 to the blender 110; the third valve 142 for controlling flow of third fluid from the third container 140; and the blender 110. In some examples, some or all of these elements are controlled by an entity other than the controller 150.

The controller 150 is configured to determine the ratio of fluids required to provide a cylinder oil. For example, the controller 150 is configured to determine a ratio of first fluid, second fluid and third fluid for blending to provide a cylinder oil, corresponding to the amount of first fluid, second fluid, and third fluid to be delivered to the blender 110 for providing a cylinder oil.

For the purpose of determining a ratio of fluids for providing the cylinder oil, the controller 150 comprises a memory and one or more processors. The memory circuitry is arranged to store machine-readable instructions which, when executed by the one or more processors, cause the controller 150 to: obtain data identifying a target kinematic viscosity of a cylinder oil to be produced; obtain data identifying a target BN of the cylinder oil to be produced; obtain data identifying the kinematic viscosity and the BN of each of the first fluid, the second fluid, and the third fluid; based on at least the kinematic viscosity and the BN of each of the first fluid, the second fluid, and the third fluid, determine a ratio of first fluid, second fluid, and third fluid to produce a cylinder oil having a kinematic viscosity corresponding to the target kinematic viscosity and/or a BN corresponding to the target BN; and generate an instruction for a blender (such as the blender 110) to blend the first fluid, second fluid, and third fluid in the determined ratio. In examples, the one or more processors of the controller 150 include one or more microprocessor(s).

The controller 150 is further configured to cause the blender to blend the first fluid, second fluid, and third fluid in the determined ratio to produce the cylinder oil. In the apparatus 10 of FIG. 2, the controller 150 is configured to control the first valve 122 to provide a controlled amount of first fluid to the blender 110 according the determined ratio, to control the second valve 132 to provide a controlled amount of second fluid to the blender 110 according to the determined ratio, and to control the third valve 142 to provide a controlled amount of third fluid to the blender 110 according to the determined ratio. The ratio is typically a mass ratio (and thus the controller 150 is configured to determine a mass of first fluid and a mass of second fluid to be delivered to the blender 110), but may in some cases be a volume ratio (and thus the controller 150 is configured to determine a volume of first fluid and a volume of second fluid to be delivered to the blender 110).

In examples the controller 150 is configured to determine the ratio of fluids based on data received from one or more other entities (not shown), the data comprising at least: data identifying a target kinematic viscosity of a cylinder oil to be produced; data identifying a target BN of the cylinder oil to be produced; and data identifying the kinematic viscosity and the BN of each of the first fluid, the second fluid, and the third fluid.

In some examples, the controller 150 is configured to receive such data from one or more user input device(s) (not shown) to which a user has provided information regarding at least one of a target kinematic viscosity of a cylinder oil to be produced; a target BN of the cylinder oil to be produced; the kinematic viscosity and the BN of the first fluid, of the second fluid, and of the third fluid. Suitable user input devices include touch-screens, keyboards, wheels, and joysticks. In examples, the one or more user input device(s) is provided as part of a user interface.

Upon receipt of data indicative of at least some of the data described hereinabove, the controller 150 is configured to determine the ratio of fluids required to provide a cylinder oil having the target viscosity and/or the target BN based on an algorithm stored in the memory of the controller 150.

Figure 3:
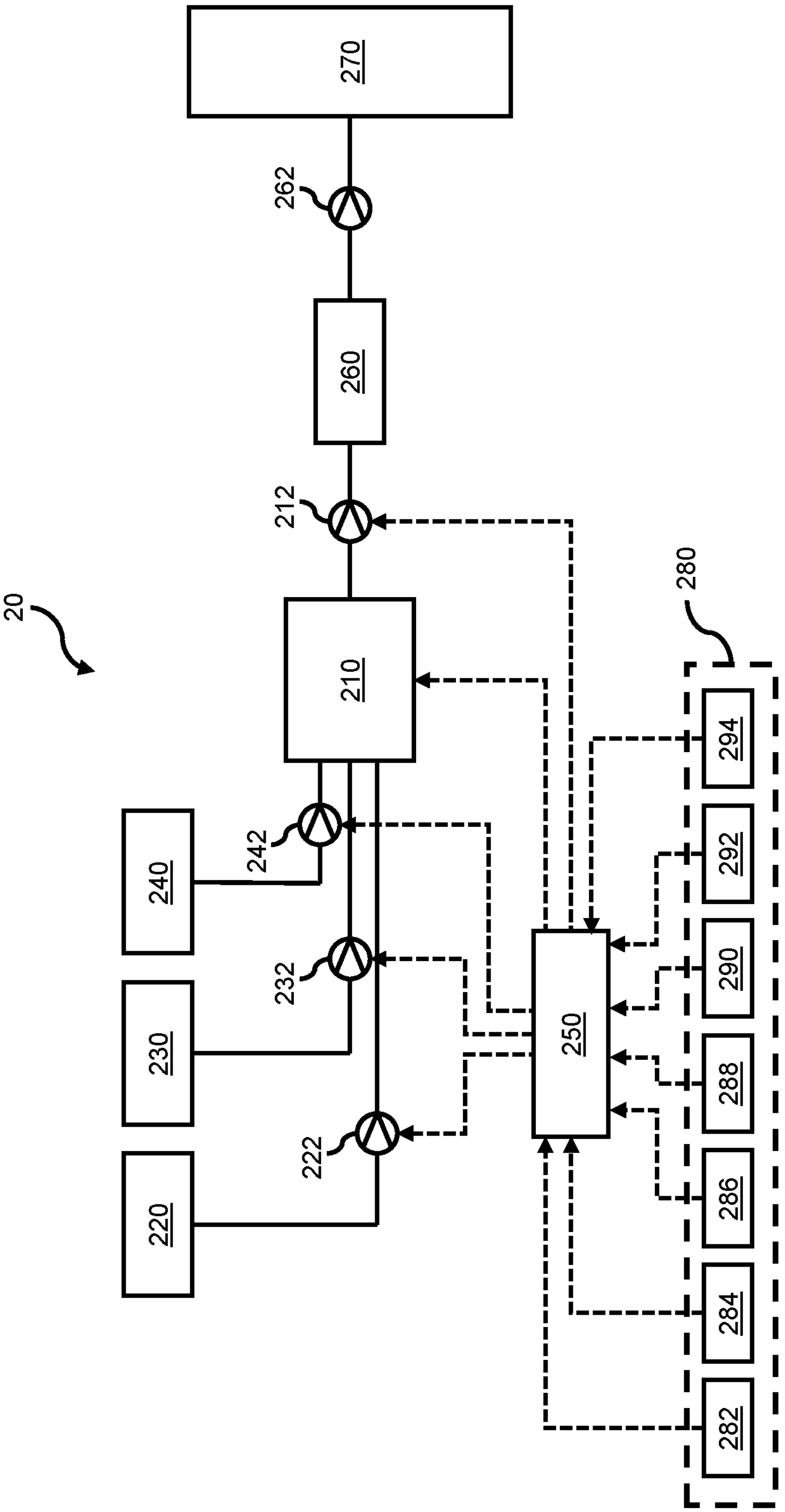
FIG. 3 shows a schematic view of an example apparatus for the preparation of a cylinder oil according to another embodiment of the present invention.

In some examples, the controller is configured to receive data indicative of an engine condition parameter, engine operation parameter, or fluid parameter, described in more detail with regard to FIG. 3. In other examples, the controller is configured to receive data indicative of a fluid condition parameter in respect of the first fluid, the second fluid, the produced cylinder oil, or any combination thereof. For example, the controller is configured to receive data indicative of the kinematic viscosity, the alkalinity (BN), and/or the temperature of the first fluid, the second fluid, the produced cylinder oil, or any combination thereof.

In examples, the controller 150 is configured to determine an amount of first fluid, an amount of second fluid, and an amount of third fluid to supply to the blender 110 for providing a cylinder oil having a target kinematic viscosity equal to or less than 14 $mm^2/s$.

FIG. 3 shows a schematic view of an apparatus 20 for preparing a cylinder oil according to another example. Some elements of the apparatus 20 shown in FIG. 3 correspond to elements already described in relation to FIG. 2, in which case the reference symbol is the reference symbol used in FIG. 2, increased by 100.

Broadly speaking, the apparatus 20 comprises a blender 210 for blending fluids to provide a cylinder oil; a first container 220 for containing a first fluid having a first kinematic viscosity and a first BN, the first container 220 in selectable fluid communication with the blender 210; a second container 230 for containing a second fluid having a second kinematic viscosity and a second BN, the second container 230 in selectable fluid communication with the blender 210; a third container 240 for containing a third fluid having a third kinematic viscosity and a third BN, the third container 240 in selectable fluid communication with the blender 210; and a controller 250 configured to determine an amount of first fluid, an amount of second fluid, and an amount of third fluid to supply to the blender 210 for providing a cylinder oil having a desired target viscosity and/or a target BN. In examples, the target kinematic viscosity is equal to or less than 14 $mm^2/s$.

More specifically, the apparatus 20 comprises one or more pumps for pumping fluid through the system. The one or more pumps can take any suitable form. The one or more pumps are optionally provided along with respective valves for controlling fluid flow (not shown). In the absence of such valves, the one or more pumps are used for selective fluid communication between elements of the apparatus, e.g. selective fluid communication between each container 220, 230, 240 and the blender 210, as the pump controls the flow of fluid from each container 220, 230, 240 to the blender 210. Although in some examples there may be flow or backflow through the pump when not operational (e.g. when the pump is not pumping), such flow or backflow is of a small magnitude such that it does not materially affect the amount of fluid provided to the blender 210. Thus, each of the containers 220, 230, 240 is in selectable fluid communication with the blender 210.

In this example, the apparatus 20 comprises a pump 222 for pumping first fluid from the first container 220 to the blender 210. The pump 222 is selectively controlled by the controller 250, described further herein. The first container 20 corresponds to the first container of the apparatus 10 depicted in FIG. 2, adapted as necessary to function in the apparatus according to the example depicted in FIG. 3.

The apparatus 20 comprises a pump 232 for pumping second fluid from the second container 230 to the blender 210. The pump 232 is selectively controlled by the controller 250, described further herein. The second container 230 corresponds to the second container 130 of the apparatus 10 depicted in FIG. 2, adapted as necessary to function in the apparatus according to the example depicted in FIG. 3.

The apparatus 20 comprises a pump 242 for pumping third fluid from the third container 240 to the blender 210. The pump 242 is selectively controlled by the controller 250, described further herein. The third container 140 corresponds to the third container 140 of the apparatus 10 depicted in FIG. 2, adapted as necessary to function in the apparatus according to the example depicted in FIG. 3.

In some examples (not shown), the pump 222 for pumping first fluid and/or the pump 232 for pumping second fluid and/or the pump 242 for pumping third fluid are omitted. For example, they are replaced with valves, and the first fluid and/or second fluid and/or third fluid flow to the blender 210 under the influence of gravity or by virtue of another pump of the apparatus 20 operating.

In other examples (not shown), rather than each container 220, 230, 240 being connected to the blender 210 via respective pumps, each of the containers 220, 230, 240 is connected to the blender 210 via one pump which is selective connected and disconnected from each of the containers 220, 230, 240, and the pump is fluidly connected to one inlet of the blender 210. In operation, for example, the pump is connected to the first container 220 and disconnected from the second 230 and third 240 containers, and pumps an amount of first fluid from the first container 220 to the blender 210. Subsequently, the pump is disconnected from the first container 220 and connected to the second container 230, and pumps an amount of second fluid from the second container 230 to the blender 210. Subsequently, the pump is disconnected from the second container 230 and connected to the third container 240, and pumps an amount of third fluid from the third container 240 to the blender 210.

As with the example depicted in FIG. 2, the apparatus 20 comprises a controller 250 for controlling the apparatus 20.

The controller 250 is provided with an algorithm that determines the required proportions of first fluid (e.g. system oil), second fluid (e.g. additive package), and third fluid (base oil) that results in a prepared cylinder oil in the blender 210 having a kinematic viscosity corresponding to a target kinematic viscosity and/or a BN corresponding to a target BN. For example, the controller 250 comprises a non-transitory computer-readable medium storing instructions that, when executed by a processor of the controller 250 (not shown), cause the processor to determine the required proportions of first fluid, second fluid, and third fluid to provide a prepared cylinder oil as discussed hereinabove.

The controller 250 is configured to control the blender 210 and the pumps 222, 232, 242 to deliver the appropriate amount of the respective fluids to the blender 210. For example, the controller 250 is configured to cause each pump to operate for a period of time such that the appropriate amount of fluid is provided to the blender 210, according to the required proportions of fluid determined by the controller 250.

In examples, the controller 250 is configured to recalculate the ratio of fluids for providing a second cylinder oil having a different viscosity and/or BN. For example, after blending a first cylinder oil, upon the controller 250 receiving data indicative of a change of temperature of the cylinder liner and/or a change of sulfur content of the fuel and/or data from an input data generator (such as a user input device or a sensor), the controller 250 is configured to determine the required proportions of first fluid, second fluid, and third fluid that results in a second cylinder oil having a kinematic viscosity corresponding to a new target kinematic viscosity and/or a suitable BN corresponding to a new target BN for lubricating the cylinder liner under the changed conditions, the kinematic viscosity and/or BN different from the previous cylinder oil.

The controller 250 receives data indicative of information about the engine from one or more input data generators for generating data indicative of information about the engine. In examples, at least some of the data is provided by one or more sensors for detecting parameters. In examples, at least some of the data is provided from a memory comprising information provided by a user, e.g. by inputting data with a user input device provided as part of a user interface (not shown). In examples, the data is obtained from look-up tables comprised in a memory of the controller 250.

The controller 250 is communicatively connected to, and for receiving data from, one or more input data generators of an input data generator array 280. Each input data generator provides data to the controller 250 indicative of an engine operation parameter and/or an engine condition parameter and/or a fluid parameter. Typically, each input data generator is a sensor for sensing an engine operation parameter, engine condition parameter or fluid parameter (or a parameter indicative to said parameter), or is a memory containing data indicative of the engine operation parameter or engine condition parameter. For example, an input data generator may comprise a memory into which has been entered information regarding a parameter (e.g. the sulfur content fuel being supplied to the engine 4) that can be communicated to the controller 250. The input data generator or the controller 250 typically determines the engine operation parameter or engine condition parameter based on the data received from the memory or sensor and a lookup table stored in the controller 250 or the input data generator.

In FIG. 3, the input data generator array 280 comprises: an input data generator 282 for generating data indicative of the sulfur content of the fuel; an input data generator 284 for generating data indicative of engine load of the engine 4; an input data generator 286 for generating data indicative of engine speed of the engine 4; an input data generator 288 for generating data indicative of the relative air humidity in the cylinder; an input data generator 290 for generating data indicative of the cylinder ferrous wear emission; an input data generator 292 for generating data indicative of the cylinder lubricant residual BN; and an input data generator 294 for generating data indicative of the cylinder oil liner temperature. In examples, one or more of the input data generators is a user input device comprised in a user interface, as described hereinabove in relation to FIG. 2.

In examples, the input data generator is a sensor for sensing an engine operation parameter or engine condition parameter and generating data indicative of the parameter, or a sensor for sensing a parameter related to an engine operation parameter or engine condition parameter based on which the sensor and/or the controller 250 determines the engine operation parameter or engine condition parameter. For example, the input data generator 282 for generating data indicative of the sulfur content of the fuel is a fuel sensor for sensing a property of the fuel oil to be provided to the engine 4 such as, for example, the sulfur content of the fuel oil (e.g. an inline or offline X-ray fluorescence sulfur-in-oil analyser); the input data generator 288 for generating data indicative of the relative air humidity is a hygrometer arranged in or near a cylinder of the engine 4 for sensing relative air humidity; the input data generator 290 for generating data indicative of the cylinder ferrous wear emission is a magnetometer arranged to detect ferrous wear emission in the cylinder; the input data generator 292 for generating data indicative of the cylinder lubricant residual BN is an infrared spectrometer arranged to analyse cylinder oil in the cylinder; the input data generator 294 for generating data indicative of the cylinder oil liner temperature is a temperature sensor for sensing temperature arranged in or near a cylinder of the engine 4, such as a thermometer, thermocouple, thermistor or the like.

In other examples, the controller 250 is communicatively connected to, and for receiving data from, any combination of the input data generators described hereinabove.

In other examples (not shown), the controller 250 is configured to receive data indicative of a fluid condition parameter in respect of the system oil, the additive packet, the base oil, the produced cylinder oil, or any combination thereof. The controller 250 is communicatively connected to, and for receiving data from, one or more input data generators indicative of a fluid condition parameter. Typically, each input data generator is a sensor for sensing a fluid condition parameter (or a parameter indicative to said parameter), or is a memory containing information regarding the fluid condition parameter.

Fluid condition parameters include the kinematic viscosity, the alkalinity (BN), and/or the temperature of fluid. In examples, the input data generator for generating data indicative of kinematic viscosity is a viscosity sensor arranged to detect the kinematic viscosity of a fluid; the input data generator for generating data indicative of alkalinity is an infrared spectrometer arranged to detect the alkalinity of a fluid; the input data generator for generating data indicative of the fluid temperature is a temperature sensor for sensing temperature arranged in or near a fluid, such as a thermometer, thermocouple, thermistor or the like.

In examples, the controller 250 is configured to obtain or determine the target BN for the produced cylinder oil. The controller 250 is configured to receive information (e.g. data from an input data generator 282 indicating the sulfur content of the fuel) and determine the target BN from a lookup table stored in a memory the controller 250 or by using an algorithm stored in a memory of the controller 250.

The blender 210 is in selectable fluid communication with a storage tank 260 for storing the cylinder oil prepared in the blender. The storage tank 260 is, for example, a day tank. A pump 212 is arranged between the blender 210 and the storage tank 260 for pumping the prepared cylinder oil to the storage tank 260. The controller 250 is configured to selectively cause the pump 212 to pump prepared cylinder oil from the blender 210 to a storage tank 260. In other examples (not shown), the controller 250 is not communicatively connected to the pump 212, which is instead controlled by a separate controller.

The storage tank 260 is in selectable fluid communication with the cylinder liner 270 of the engine 4. A pump 262 is arranged between the storage tank 260 and the cylinder liner 270 for pumping the stored cylinder oil from the storage tank 260 to the cylinder liner 270. In the example of FIG. 3, the pump 262 is controlled by a controller which is not part of the blending apparatus 20. In other examples (not shown), the controller 250 of the blending apparatus 20 is configured to selectively cause the pump 262 to pump stored cylinder oil from the storage tank 260 to the cylinder liner 270.

In other examples (not shown), the storage tank 260 is omitted, and the blender 210 is fluidly connected to the cylinder liner 270 via a pump, such that the prepared fluid is provided to the cylinder liner 270 directly from the blender 210.

In examples (not shown), the apparatus 20 comprises a user input device for a user to select a mode of operation of the apparatus 20/controller 250. In these examples, the user input device is communicatively connected to the controller 250 and is configured to send data indicative of the selected mode of operation to the controller 250. The controller 250 is configured to cause the apparatus 20 to operate in the first mode upon receiving data indicative of a user selecting the first mode of operation; the controller 250 is configured to cause the apparatus 20 to operate in the second mode upon receiving data indicative of a user selecting the second mode of operation. In some examples, further modes of operation are selectable and operable. In other examples, the controller 250 and apparatus 20 is caused to operate in a mode of operation based on data received from an input data generator as discussed hereinabove.

Figure 4:
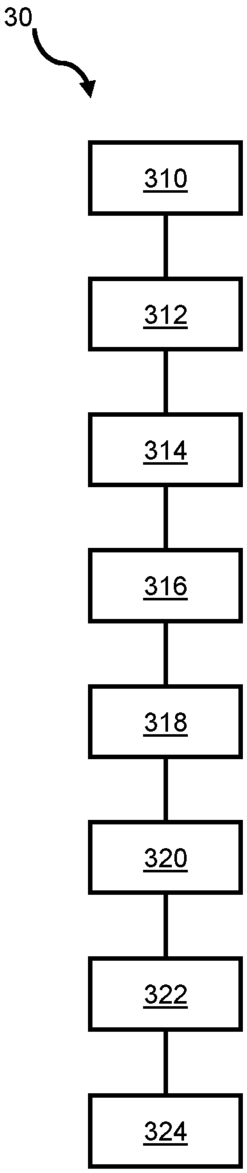
FIG. 4 shows a flow chart illustrating an example of a method of producing a cylinder oil according to an embodiment of the present invention.

FIG. 4 shows a flow chart illustrating a method for producing a cylinder oil for a marine reciprocating internal combustion engine according to an example. The method 30 comprises providing a first fluid having a first kinematic viscosity and a first BN 310; providing a second fluid having a second kinematic viscosity and a second BN 312; providing a third fluid having a third kinematic viscosity and a third BN 314; obtaining data identifying a target kinematic viscosity of a cylinder oil to be produced 316; obtaining data identifying a target BN of the cylinder oil to be produced 318; and obtaining data identifying the kinematic viscosity and the BN of each of the first fluid, the second fluid, and the third fluid 320. The method 30 further comprises determining 322, based on at least the kinematic viscosity and the BN of each of the first fluid, the second fluid, and the third fluid, a ratio of first fluid, second fluid, and third fluid to produce a cylinder oil having a kinematic viscosity corresponding to the target kinematic viscosity and/or a BN corresponding to the target BN. The method further comprises blending the first fluid, second fluid, and third fluid in the determined ratio to produce the cylinder oil 324. In examples, the method 30 of FIG. 4 is carried out using an apparatus as described hereinabove.

The ratio of blending 324 is dependent on the amount of first fluid provided to the blender 110, 210, the amount of second fluid provided to the blender 110, 210, and the amount of third fluid provided to the blender 110, 210.

The providing 310 the first fluid typically comprises providing a controlled amount of first fluid from a first container 120, 220 containing first fluid, e.g. system oil. The controlled amount corresponds to the amount of first fluid required to blend the fluids in the determined ratio. The providing 310 in examples is controlled by a controller 150, 250, e.g. the controller 150, 250 causes a pump to pump the amount of first fluid from the first container 120, 220 to the blender 110, 210. In other examples, the providing 312 is controlled manually, e.g. an operator operating a valve 122 or pump 222 to provide the controlled amount to the blender 110, 210.

The providing 312 the second fluid typically comprises providing a controlled amount of second fluid from a second container 130, 230 containing second fluid, e.g. additive packet. The controlled amount corresponds to the amount of second fluid required to blend the fluids in the determined ratio. The providing 312 in examples is controlled by a controller 150, 250, e.g. the controller 150, 250 causes a pump to pump the amount of second fluid from the second container 130, 230 to the blender 110, 210. In other examples, the providing 312 is controlled manually, e.g. an operator operating a valve 132 or pump 232 to provide the controlled amount to the blender 110, 210.

The providing 314 the third fluid typically comprises providing a controlled amount of third fluid from a third container 140, 240 containing third fluid, e.g. base oil. The controlled amount corresponds to the amount of third fluid required to blend the fluids in the determined ratio. The providing 314 in examples is controlled by a controller 150, 250, e.g. the controller 150, 250 causes a pump to pump the amount of third fluid from the third container 140, 240 to the blender 110, 210. In other examples, the providing 314 is controlled manually, e.g. an operator operating a valve 142 or pump 242 to provide the controlled amount to the blender 110, 210.

The obtaining 316 data identifying a target kinematic viscosity of a cylinder oil to be produced typically comprises a controller 150, 250 receiving data indicative of the target kinematic viscosity. In examples the data is received from a user input device (e.g. a user has inputted a target kinematic viscosity to a user input device communicatively connected to the controller 150, 250), or from a sensor (e.g. data is generated by a sensor communicatively connected to the controller 150, 250).

The obtaining 318 data identifying a target BN of a cylinder oil to be produced typically comprises a controller 150, 250 receiving data indicative of the target BN. In examples the data is received from a user input device (e.g. a user has inputted a target BN to a user input device communicatively connected to the controller 150, 250), or from a sensor (e.g. data is generated by a sensor communicatively connected to the controller 150, 250).

The obtaining 320 data identifying the kinematic viscosity and the BN of each of the first fluid, the second fluid, and the third fluid typically comprises a controller 150, 250 receiving data which is indicative of: the kinematic viscosity of the first fluid; the BN of the first fluid; the kinematic viscosity of the second fluid; the BN of the second fluid; the kinematic viscosity of the third fluid; and the BN of the third fluid. In examples the data is received from one or more user input device(s) (e.g. a user has inputted data in respect of at least some of the parameters described above to a user input device communicatively connected to the controller 150, 250), or from a sensor (e.g. one or more sensors for sensing a fluid parameter as described above communicatively connected to the controller 150, 250 has generated data). In some examples, the obtaining 320 comprises receiving data from both a user input device and one or more sensors.

The determining 322 the ratio of first fluid, second fluid, and third fluid to produce a cylinder oil is based on at least the kinematic viscosity and the BN of each of the first fluid, the second fluid, and the third fluid. In examples, the determining is also based on the target viscosity of the cylinder oil to be produced. In other examples, the determining is also based on the target BN of the cylinder oil to be produced. An example of the determining 322 is depicted in FIG. 5, described hereinbelow.

The blender 110, 210 having received the controlled amounts of first fluid, second fluid, and third fluid, the blending 324 in the determined ratio comprises operating the blender 110, 210 to mix the fluids together in the determined ratio, thereby providing the cylinder oil having a kinematic viscosity corresponding to the target kinematic viscosity and/or a BN corresponding to the target BN.

Figure 5:
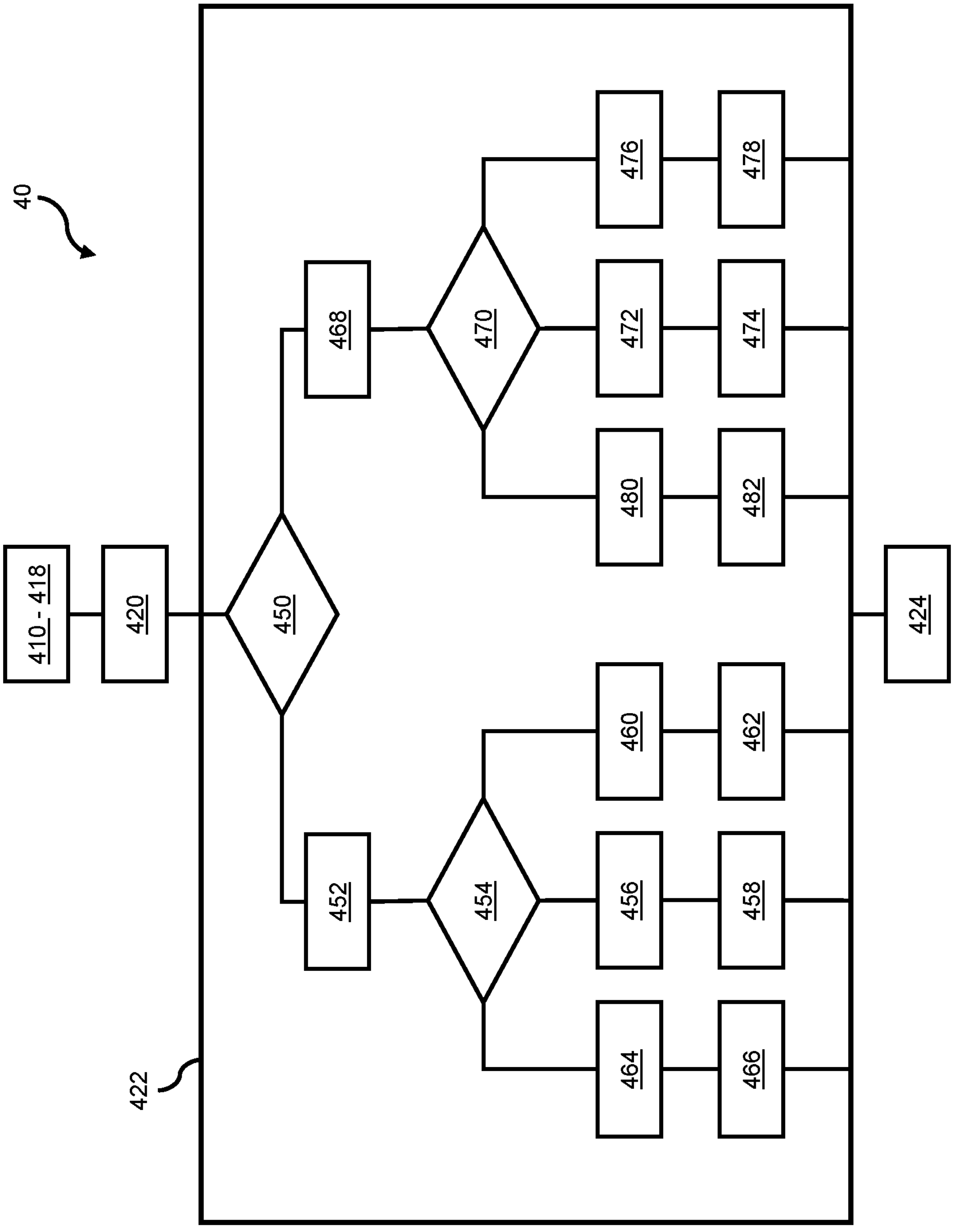
FIG. 5 shows a flow chart illustrating an example of a method of producing a cylinder oil according to another embodiment of the present invention.

FIG. 5 shows a flow chart illustrating a method 40 of producing a cylinder oil. Some elements of the method 40 correspond to elements of the method 30 described in FIG. 4. Where this applies, the reference symbol in FIG. 5 is the reference symbol used in FIG. 4, increased by 100.

The method 40 comprises carrying out steps 410 to 418, which correspond to steps 310 to 318 respectively of the method 30. The method 40 further comprises obtaining data 420 identifying the kinematic viscosity and the BN of each of the first fluid, the second fluid, and the third fluid, as described hereinabove with reference to step 320 of method 30.

The method 40 further comprises determining 422 a ratio of first fluid, second fluid, and third fluid to produce a cylinder oil.

The determining 422 a ratio of first fluid, second fluid, and third fluid to produce a cylinder oil comprises receiving data 450 indicative of a selection of mode operation of controller 150, 250 and/or the apparatus 10, 20. Typically, the receiving data 450 comprises receiving from a user input device (e.g. comprised in a user interface) data indicative of a user's selection of operation indicating that the apparatus 10, 20 should be operated in the first mode, or in the second mode. In other examples (not shown), the receiving data 450 comprises receiving data indicating that the apparatus 10, 20 should be operated in a third mode.

Where the user inputs a selection of the first mode of operation, the method 40 comprises determining 454 that a first mode of operation has been selected by a user. In examples, the first mode of operation is referred to as "viscosity mode".

In the first mode of operation, the determining 422 a ratio of first fluid, second fluid, and third fluid to produce a cylinder oil comprises determining 454, based on the target kinematic viscosity of the cylinder oil to be produced, the kinematic viscosity of each of the first fluid, second fluid, and third fluid, and the BN of each of the first fluid, second fluid, and third fluid, a BN range for the cylinder oil having an upper limit and a lower limit.

In examples, the determining 454 the BN range for the cylinder oil comprises computing the following equations (the symbols having the meaning given in the Summary):

$$BN_{C1} = \frac{Vi_2BN_3 + Vi_{C(T)}BN_2 - Vi_{C(T)}BN_3 - Vi_3BN_2}{Vi_2 - Vi_3} \quad \text{Equation (1)}$$

$$BN_{C2} = \frac{Vi_2BN_1 + Vi_{C(T)}BN_2 - Vi_{C(T)}BN_1 - Vi_1BN_2}{Vi_2 - Vi_1} \quad \text{Equation (2)}$$

$$BN_{C3} = \frac{Vi_{C(T)}BN_1 - Vi_{C(T)}BN_3 + Vi_1BN_3 - Vi_3BN_1}{Vi_1 - Vi_3} \quad \text{Equation (3)}$$

Solving the equations provides computed values $BN_{C1}$, $BN_{C2}$, and $BN_{C3}$. The determining 454 the BN range further comprises: determining the highest value of $BN_{C1}$, $BN_{C2}$, and $BN_{C3}$ and setting the determined highest value as the upper limit of the determined BN range; and determining the second-highest value of $BN_{C1}$, $BN_{C2}$, and $BN_{C3}$ and setting the determining second-highest value as the lower limit of the determined BN range.

In examples, the method 40 comprises determining 456 that the target BN of the cylinder oil is equal to the upper limit or lower limit of the determined BN range, or is between the upper limit and lower limit of the determined BN range. In these examples, the method 40 further comprises determining 458 a ratio of first fluid, second fluid, and third fluid which corresponds to the target kinematic viscosity and the target BN (e.g. corresponds to both $Vi_{C(T)}$ and $BN_{C(T)}$).

In examples, the method 40 comprises determining 460 that the target BN of the cylinder oil is greater than the determined upper limit of the determined BN range. In these examples, the method 40 further comprises determining 462 a ratio of first fluid, second fluid, and third fluid which corresponds to the target kinematic viscosity and the upper limit of the determined BN range (e.g. corresponds to $Vi_{C(T)}$ and the determined highest value of $BN_{C1}$, $BN_{C2}$, and $BN_{C3}$).

In examples, the method 40 comprises determining 464 that the target BN of the cylinder oil is lower than the determined lower limit of the determined BN range. In these examples, the method 40 further comprises determining 466 a ratio of first fluid, second fluid, and third fluid which corresponds to the target kinematic viscosity and the lower limit of the determined BN range (e.g. corresponds to $Vi_{C(T)}$ and the determined second-highest value of $BN_{C1}$, $BN_{C2}$, and $BN_{C3}$).

Where the user inputs a selection of the second mode of operation, the method 40 comprises determining 468 that a second mode of operation has been selected by a user. In examples, the second mode of operation is referred to as "BN mode".

In the second mode of operation, the determining 422 a ratio of first fluid, second fluid, and third fluid to produce a cylinder oil comprises determining 470, based on the target BN of the cylinder oil to be produced, the kinematic viscosity of each of the first fluid, second fluid, and third fluid, and the BN of each of the first fluid, second fluid, and third fluid, a kinematic viscosity range for the cylinder oil having an upper limit and a lower limit.

In examples, the determining 470 the kinematic viscosity range for the cylinder oil comprises computing the following equations (the symbols having the meaning given in the Summary):

$$Vi_{C1} = -\frac{Vi_3BN_2 - Vi_3BN_{C(T)} - Vi_2BN_3 + Vi_2BN_{C(T)}}{BN_3 - BN_2} \quad \text{Equation (4)}$$

$$Vi_{C2} = -\frac{Vi_2BN_1 - Vi_2BN_{C(T)} - Vi_1BN_2 + Vi_1BN_{C(T)}}{BN_2 - BN_1} \quad \text{Equation (5)}$$

$$Vi_{C3} = -\frac{Vi_3BN_1 - Vi_3BN_{C(T)} - Vi_1BN_3 + Vi_1BN_{C(T)}}{BN_3 - BN_1} \quad \text{Equation (6)}$$

Solving the equations provides computed values $Vi_{C1}$, $Vi_{C2}$, and $Vi_{C3}$. The determining 470 the kinematic viscosity range further comprises: determining the lowest value of $Vi_{C1}$, $Vi_{C2}$, and $Vi_{C3}$ and setting the determined lowest value as the lower limit of the determined Vi range; and determining the second-lowest value of $Vi_{C1}$, $Vi_{C2}$, and $Vi_{C3}$ and setting the determining second-lowest value as the upper limit of the determined Vi range.

In examples, the method 40 comprises determining 472 that the target kinematic viscosity of the cylinder oil is equal to the upper limit or lower limit of the determined kinematic viscosity range, or is between the upper limit and lower limit of the determined kinematic viscosity range. In these examples, the method 40 comprises determining 474 a ratio of first fluid, second fluid, and third fluid which corresponds to the target kinematic viscosity and the target BN (e.g. corresponds to both $Vi_{C(T)}$ and $BN_{C(T)}$).

In examples, the method 40 comprises determining 476 that the target kinematic viscosity of the cylinder oil is greater than the determined upper limit of the determined kinematic viscosity range. In these examples, the method 40 comprises determining 478 a ratio of first fluid, second fluid, and third fluid which corresponds to the target BN and the upper limit of the determined kinematic viscosity range (e.g. corresponds to $BN_{C(T)}$ and the determined second-lowest value of $Vi_{C1}$, $Vi_{C2}$, and $Vi_{C3}$).

In examples, the method 40 comprises determining 480 that the target kinematic viscosity of the cylinder oil is lower than the determined lower limit of the determined kinematic viscosity range. In these examples, the method 40 comprises determining 482 a ratio of first fluid, second fluid, and third fluid which corresponds to the target BN and the lower limit of the determined kinematic viscosity range (e.g. corresponds to $BN_{C(T)}$ and the determined lowest value of $Vi_{C1}$, $Vi_{C2}$, and $Vi_{C3}$).

The method 40 further comprises blending 424 the first, second, and third fluids in a ratio as determined according to block 458, 462, 466 474, 478, or 482, depending on the outcome of the determinations carried out in block 422.

Figure 6:
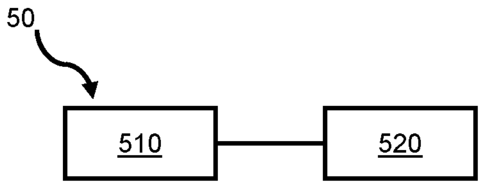
FIG. 6 shows a flow chart illustrating an example of a method of operating a marine reciprocating internal combustion engine according to an embodiment of the present invention.

FIG. 6 shows a flow chart illustrating a method 50 of operating a marine reciprocating internal combustion engine. The method 50 comprises producing a cylinder oil 510. The producing the cylinder oil 510 comprises carrying out any of the methods described hereinabove. The method 50 further comprises supplying 520 the produced cylinder to a cylinder of the marine reciprocating internal combustion engine, e.g. to the cylinder liner of the cylinder. The supplying typically comprises pumping produced cylinder oil from a storage tank 260 (e.g. a day tank) to the cylinder liner 270.

In examples, any of the methods described hereinabove may be at least partially performed by the controller 150, 250 of the apparatus 10, 20. There is thus also provided a non-transitory computer-readable storage medium storing instructions that, if executed by a processor of a controller 150, 250, cause the processor to carry out a method as described hereinabove.

Figure 7:
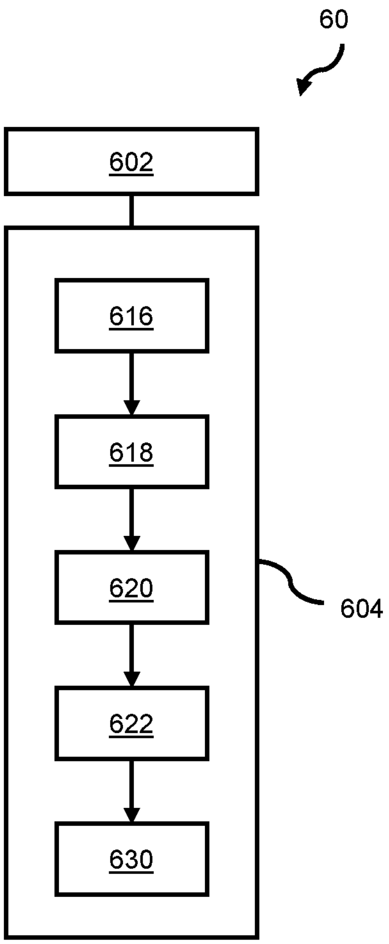
FIG. 7 shows a schematic view of an example computer-readable medium according to an embodiment of the present invention.

FIG. 7 shows an example 60 of a processor 602 that is arranged to execute instructions stored on a non-transitory computer-readable storage medium 604. The storage medium 604 may comprise volatile or non-volatile memory, such as Random-Access Memory. The storage medium 604 may alternatively comprise non-volatile data storage such as a hard disk drive or solid-state memory. In examples, the processor 602 and storage medium 604 form part of a cylinder oil blending apparatus for a marine vessel. In examples, the processor 602 and storage medium 604 form part of an embedded computing system.

Some instructions stored on the storage medium 604 in FIG. 7 cause the processor 602 to carry out steps corresponding to steps of the method 30 described in FIG. 4. Where this applies, the reference symbol in FIG. 7 is the reference symbol used in FIG. 4, increased by 100.

Via instruction 616, the processor 602 is instructed to obtain data identifying a target kinematic viscosity of a cylinder oil to be produced. This typically comprises obtaining data stored in the memory 604, or data from one or more input data generators such as a user input device or a sensor. Via instruction 618, the processor 602 is instructed to obtain data identifying a target BN of the cylinder oil to be produced. This typically comprises obtaining data stored in the memory 604, or data from one or more input data generators such as a user input device or a sensor. Via instruction 620, the processor 602 is instructed to obtain data identifying the kinematic viscosity and BN of each of a first fluid, a second fluid, and a third fluid. This typically comprises obtaining data stored in the memory 604, and/or data from one or more input data generators such as a user input device or a sensor. Via instruction 622, the processor 602 is instructed to determine a ratio of first fluid, second fluid, and third fluid to produce the cylinder oil having a kinematic viscosity corresponding to the target kinematic viscosity and/or a BN corresponding to the target BN. In examples, this comprises determining a ratio as depicted in FIG. 5. Via instruction 630 the processor is instructed to generate an instruction for a blender to blend the first fluid, second fluid, and third fluid in the determined ratio. In examples, the processor generating instructions for a blender via instructions 630 comprises causing the apparatus to blend fluids as described with reference to FIG. 4.

In examples, the non-transitory computer-readable storage medium 604 comprises further instructions which cause the processor to carry out steps that cause steps of any of the methods described hereinabove to be performed by the relevant component.

In other embodiments, two or more of the above described embodiments may be combined. In other embodiments, features of one embodiment may be combined with features of one or more other embodiments.

Embodiments of the present invention have been discussed with particular reference to the examples illustrated. However, it will be appreciated that variations and modifications may be made to the examples described within the scope of the invention.

What is claimed is:

1. A method for producing a cylinder oil for a marine reciprocating internal combustion engine, the method comprising:

providing a first fluid having a first kinematic viscosity and a first BN;

providing a second fluid having a second kinematic viscosity and a second BN;

providing a third fluid having a third kinematic viscosity and a third BN;

obtaining data identifying a target kinematic viscosity of a cylinder oil to be produced;

obtaining data identifying a target BN of the cylinder oil to be produced;

obtaining data identifying the kinematic viscosity and the BN of each of the first fluid, the second fluid, and the third fluid;

either:

(a) based on at least the target kinematic viscosity of the cylinder oil to be produced, the kinematic viscosity and the BN of each of the first fluid, the second fluid, and the third fluid, determining a BN range for the cylinder oil having an upper limit and a lower limit, the determining the BN range for the cylinder oil comprising: solving:

$$BN_{C1} = \frac{Vi_2BN_3 + Vi_{C(T)}BN_2 - Vi_{C(T)}BN_3 - Vi_3BN_2}{Vi_2 - Vi_3} \quad \text{Equation (1)}$$

$$BN_{C2} = \frac{Vi_2BN_1 + Vi_{C(T)}BN_2 - Vi_{C(T)}BN_1 - Vi_1BN_2}{Vi_2 - Vi_1} \quad \text{Equation (2)}$$

$$BN_{C3} = \frac{Vi_{C(T)}BN_1 - Vi_{C(T)}BN_3 + Vi_1BN_3 - Vi_3BN_1}{Vi_1 - Vi_3} \quad \text{Equation (3)}$$

wherein:

$BN_{C1}$ is a first calculated BN for the cylinder oil,
$BN_{C2}$ is a second calculated BN for the cylinder oil,
$BN_{C3}$ is a third calculated BN for the cylinder oil, $Vi_{C(T)}$ is a value corresponding to the target kinematic viscosity of the cylinder oil to be produced, $Vi_1$ is a value corresponding to the kinematic viscosity of the first fluid, $Vi_2$ is a value corresponding to the kinematic viscosity of the second fluid, $Vi_3$ is a value corresponding to the kinematic viscosity of the third fluid, $BN_1$ is the BN of the first fluid or a value corresponding to the BN of the first fluid, $BN_2$ is the BN of the second fluid or a value corresponding to the BN of the second fluid, and $BN_3$ is the BN of the third fluid or a value corresponding to the BN of the third fluid;

determining the highest value of $BN_{C1}$, $BN_{C2}$, and $BN_{C3}$;

setting the determined highest value as the upper limit of the determined BN range;

determining the second-highest value of $BN_{C1}$, $BN_{C2}$, and $BN_{C3}$;

setting the determined second-highest value as the lower limit of the determined BN range;

and determining that the target BN of the cylinder oil is equal to the upper limit or lower limit of the determined BN range, or is between the upper limit and lower limit of the determined BN range, and determining a ratio of first fluid, second fluid, and third fluid which corresponds to the target kinematic viscosity and the target BN;

or determining that the target BN of the cylinder oil is greater than the determined upper limit of the determined BN range, and determining a ratio of first fluid, second fluid, and third fluid which corresponds to the target kinematic viscosity and the upper limit of the determined BN range;

or determining that the target BN of the cylinder oil is lower than the determined lower limit of the determined BN range, and determining a ratio of first fluid, second fluid, and third fluid which corresponds to the target kinematic viscosity and the lower limit of the determined BN range;

or (b) based on at least the target BN of the cylinder oil to be produced, the kinematic viscosity of each of the first fluid, second fluid, and third fluid, and the BN of each of the first fluid, second fluid, and third fluid, determining a kinematic viscosity range for the cylinder oil having an upper limit and a lower limit, the determining the kinematic viscosity range for the cylinder oil comprising:

solving;

$$Vi_{C1} = -\frac{Vi_3BN_2 - Vi_3BN_{C(T)} - Vi_2BN_3 + Vi_2BN_{C(T)}}{BN_3 - BN_2} \quad \text{Equation (4)}$$

$$Vi_{C2} = -\frac{Vi_2BN_1 - Vi_2BN_{C(T)} - Vi_1BN_2 + Vi_1BN_{C(T)}}{BN_2 - BN_1} \quad \text{Equation (5)}$$

$$Vi_{C3} = -\frac{Vi_3BN_1 - Vi_3BN_{C(T)} - Vi_1BN_3 + Vi_1BN_{C(T)}}{BN_3 - BN_1} \quad \text{Equation (6)}$$

wherein:

$Vi_{C1}$ is a first calculated value corresponding to a kinematic viscosity for the cylinder oil, $Vi_{C2}$ is a second calculated value corresponding to a kinematic viscosity for the cylinder oil, $Vi_{C3}$ is a third calculated value corresponding to a kinematic viscosity for the cylinder oil, $BN_{C(T)}$ is the target BN of the cylinder oil to be produced, $Vi_1$ is a value corresponding to the kinematic viscosity of the first fluid, $Vi_2$ is a value corresponding to the kinematic viscosity of the second fluid, $Vi_3$ is a value corresponding to the kinematic viscosity of the third fluid, $BN_1$ is the BN of the first fluid or a value corresponding to the BN of the first fluid, $BN_2$ is the BN of the second fluid or a value corresponding to the BN of the second fluid, and $BN_3$ is the BN of the third fluid or a value corresponding to the BN of the third fluid;

determining the lowest value of $Vi_{C1}$, $Vi_{C2}$, and $Vi_{C3}$;

setting the determined lowest value as the lower limit of the determined kinematic viscosity range;

determining the second-lowest value of $Vi_{C1}$, $Vi_{C2}$, and $Vi_{C3}$;

setting the determined second-lowest value as the upper limit of the determined kinematic viscosity range; and determining that the target kinematic viscosity of the cylinder oil is equal to the upper limit or lower limit of the determined kinematic viscosity range, or is between the upper limit and lower limit of the determined kinematic viscosity range, and determining a ratio of first fluid, second fluid, and third fluid which corresponds to the target kinematic viscosity and the target BN;

or determining that the target kinematic viscosity of the cylinder oil is greater than the determined upper limit of the determined kinematic viscosity range, and determining a ratio of first fluid, second fluid, and third fluid which corresponds to the target BN and the upper limit of the determined kinematic viscosity range;

or determining that the target kinematic viscosity of the cylinder oil is lower than the determined lower limit of the determined kinematic viscosity range, and determining a ratio of first fluid, second fluid, and third fluid which corresponds to the target BN and the lower limit of the determined kinematic viscosity range;

and blending the first fluid, second fluid, and third fluid in the determined ratio to produce the cylinder oil.

2. The method of claim 1, wherein the obtaining data identifying the target kinematic viscosity of the cylinder oil to be produced comprises determining a target kinematic viscosity based on an engine operation parameter and/or an engine condition parameter.

3. The method of claim 1, wherein the obtaining data identifying the target BN of the cylinder oil to be produced comprises determining a target BN based on an engine operation parameter and/or an engine condition parameter.

4. The method of claim 1, wherein:
the first fluid is a system oil; and/or
the second fluid is an additive package, fresh cylinder oil, or used cylinder oil; and/or
the third fluid is a base oil.

5. An apparatus for the preparation of a cylinder oil comprising:
a blender;
a first container for containing a first fluid having a first kinematic viscosity and a first BN, the first container in selectable fluid communication with the blender;
a second container for containing a second fluid having a second kinematic viscosity and a second BN; the second container in selectable fluid communication with the blender;
a third container for containing a third fluid having a third kinematic viscosity and a third BN, the third container in selectable fluid communication with the blender; and
a controller configured to operate in a first mode and/or a second mode and:
obtain data identifying a target kinematic viscosity of the cylinder oil to be produced;
obtain data identifying a target BN of the cylinder oil to be produced;
obtain data identifying the kinematic viscosity and BN of each of the first fluid, the second fluid, and the third fluid;
wherein, when operated in the first mode, the controller is further configured to:
based on at least the target kinematic viscosity of the cylinder oil to be produced, the kinematic viscosity of each of the first fluid, second fluid, and third fluid, and the BN of each of the first fluid, second fluid, and third fluid, determine a BN range for the cylinder oil having an upper limit and a lower limit, the determining the BN range comprising:
solving:

$$BN_{C1} = \frac{Vi_2BN_3 + Vi_{C(T)}BN_2 - Vi_{C(T)}BN_3 - Vi_3BN_2}{Vi_2 - Vi_3} \quad \text{Equation (1)}$$

$$BN_{C2} = \frac{Vi_2BN_1 + Vi_{C(T)}BN_2 - Vi_{C(T)}BN_1 - Vi_1BN_2}{Vi_2 - Vi_1} \quad \text{Equation (2)}$$

$$BN_{C3} = \frac{Vi_{C(T)}BN_1 - Vi_{C(T)}BN_3 + Vi_1BN_3 - Vi_3BN_1}{Vi_1 - Vi_3} \quad \text{Equation (3)}$$

wherein:
$BN_{C1}$ is a first calculated BN for the cylinder oil,
$BN_{C2}$ is a second calculated BN for the cylinder oil,
$BN_{C3}$ is a third calculated BN for the cylinder oil,
$Vi_{C(T)}$ is a value corresponding to the target kinematic viscosity of the cylinder oil to be produced,
$Vi_1$ is a value corresponding to the kinematic viscosity of the first fluid,
$Vi_2$ is a value corresponding to the kinematic viscosity of the second fluid,
$Vi_3$ is a value corresponding to the kinematic viscosity of the third fluid,
$BN_1$ is the BN of the first fluid or a value corresponding to the BN of the first fluid,
$BN_2$ is the BN of the second fluid or a value corresponding to the BN of the second fluid, and
$BN_3$ is the BN of the third fluid or a value corresponding to the BN of the third fluid
determining the highest value of $BN_{C1}$, $BN_{C2}$, and $BN_{C3}$;
setting the determined highest value as the upper limit of the determined BN range;
determining the second-highest value of $BN_{C1}$, $BN_{C2}$, and $BN_{C3}$; and
setting the determined second-highest value as the lower limit of the determined BN range, and
determine that the target BN of the cylinder oil is equal to the upper limit or lower limit of the determined BN range, or is between the upper limit and lower limit of the determined BN range, and
determine a ratio of first fluid, second fluid, and third fluid which corresponds to the target kinematic viscosity and the target BN;
or
determine that the target BN of the cylinder oil is greater than the determined upper limit of the determined BN range, and
determine a ratio of first fluid, second fluid, and third fluid which corresponds to the target kinematic viscosity and the upper limit of the determined BN range;
or
determine that the target BN of the cylinder oil is lower than the determined lower limit of the determined BN range, and
determine a ratio of first fluid, second fluid, and third fluid which corresponds to the target kinematic viscosity and the lower limit of the determined BN range; and
cause the blender to blend the first fluid, second fluid, and third fluid in the determined ratio to produce the cylinder oil; and
wherein, when operated in the second mode, the controller is further configured to:
based on at least the target BN of the cylinder oil to be produced, the kinematic viscosity of each of the first fluid, second fluid, and third fluid, and the BN of each of the first fluid, second fluid, and third fluid, determine a kinematic viscosity range for the cylinder oil having an upper limit and a lower limit, the determining the kinematic viscosity range comprising:
solving:

$$Vi_{C1} = -\frac{Vi_3BN_2 - Vi_3BN_{C(T)} - Vi_2BN_3 + Vi_2BN_{C(T)}}{BN_3 - BN_2} \quad \text{Equation (4)}$$

$$Vi_{C2} = -\frac{Vi_2BN_1 - Vi_2BN_{C(T)} - Vi_1BN_2 + Vi_1BN_{C(T)}}{BN_2 - BN_1} \quad \text{Equation (5)}$$

$$Vi_{C3} = -\frac{Vi_3BN_1 - Vi_3BN_{C(T)} - Vi_1BN_3 + Vi_1BN_{C(T)}}{BN_3 - BN_1} \quad \text{Equation (6)}$$

wherein:
$Vi_{C1}$ is a first calculated value corresponding to a kinematic viscosity for the cylinder oil,
$Vi_{C2}$ is a second calculated value corresponding to a kinematic viscosity for the cylinder oil,
$Vi_{C3}$ is a third calculated value corresponding to a kinematic viscosity for the cylinder oil,
$BN_{C(T)}$ is the target BN of the cylinder oil to be produced,
$Vi_1$ is a value corresponding to the kinematic viscosity of the first fluid,
$Vi_2$ is a value corresponding to the kinematic viscosity of the second fluid, $Vi_3$ is a value corresponding to the kinematic viscosity of the third fluid, $BN_1$ is the BN of the first fluid or a value corresponding to the BN of the first fluid, $BN_2$ is the BN of the second fluid or a value corresponding to the BN of the second fluid, and $BN_3$ is the BN of the third fluid or a value corresponding to the BN of the third fluid;

determining the lowest value of $Vi_{C1}$, $Vi_{C2}$, and $Vi_{C3}$;

setting the determined lowest value as the lower limit of the determined kinematic viscosity range;

determining the second-lowest value of $Vi_{C1}$, $Vi_{C2}$, and $Vi_{C3}$; and setting the determined second-lowest value as the upper limit of the determined kinematic viscosity range; and determine that the target kinematic viscosity of the cylinder oil is equal to the upper limit or lower limit of the determined kinematic viscosity range, or is between the upper limit and lower limit of the determined kinematic viscosity range, and determine a ratio of first fluid, second fluid, and third fluid which corresponds to the target kinematic viscosity and the target BN;

or determine that the target kinematic viscosity of the cylinder oil is greater than the determined upper limit of the determined kinematic viscosity range, and determine a ratio of first fluid, second fluid, and third fluid which corresponds to the target BN and the upper limit of the determined kinematic viscosity range;

or determine that the target kinematic viscosity of the cylinder oil is lower than the determined lower limit of the determined kinematic viscosity range, and determine a ratio of first fluid, second fluid, and third fluid which corresponds to the target BN and the lower limit of the determined kinematic viscosity range;

and cause the blender to blend the first fluid, second fluid, and third fluid in the determined ratio to produce the cylinder oil.

6. The apparatus of claim 5, wherein the controller is communicatively connected to one or more sensors for sensing an engine operation parameter, an engine condition parameter, and/or a fluid condition parameter.

7. The apparatus of claim 6, wherein the engine operation parameter, engine condition parameter, or fluid condition parameter is at least one of: fuel sulfur-content; engine load; engine speed; relative air humidity; cylinder ferrous wear emission; cylinder total iron content, fluid viscosity (for the first fluid, second fluid, third fluid, and/or produced cylinder oil), fluid BN (for the first fluid, second fluid, third fluid, and/or produced cylinder oil), fluid temperature (for the first fluid, second fluid, third fluid, and/or produced cylinder oil), cylinder lubricant residual BN; and cylinder oil liner temperature.

8. A non-transitory computer-readable storage medium storing instructions that, when executed by a processor, cause the processor to:

obtain data identifying a target kinematic viscosity of a cylinder oil to be produced;

obtain data identifying a target BN of the cylinder oil to be produced;

obtain data identifying the kinematic viscosity and BN of each of a first fluid, a second fluid, and a third fluid;

either:

(a) based on at least the target kinematic viscosity of the cylinder oil to be produced, the kinematic viscosity and the BN of each of the first fluid, the second fluid, and the third fluid, determine a BN range for the cylinder oil having an upper limit and a lower limit, the determining the BN range comprising:

solving:

$$BN_{C1} = \frac{Vi_2BN_3 + Vi_{C(T)}BN_2 - Vi_{C(T)}BN_3 - Vi_3BN_2}{Vi_2 - Vi_3} \quad \text{Equation (1)}$$

$$BN_{C2} = \frac{Vi_2BN_1 + Vi_{C(T)}BN_2 - Vi_{C(T)}BN_1 - Vi_1BN_2}{Vi_2 - Vi_1} \quad \text{Equation (2)}$$

$$BN_{C3} = \frac{Vi_{C(T)}BN_1 - Vi_{C(T)}BN_3 + Vi_1BN_3 - Vi_3BN_1}{Vi_1 - Vi_3} \quad \text{Equation (3)}$$

wherein:

$BN_{C1}$ is a first calculated BN for the cylinder oil, $BN_{C2}$ is a second calculated BN for the cylinder oil, $BN_{C3}$ is a third calculated BN for the cylinder oil, $Vi_{C(T)}$ is a value corresponding to the target kinematic viscosity of the cylinder oil to be produced, $Vi_1$ is a value corresponding to the kinematic viscosity of the first fluid, $Vi_2$ is a value corresponding to the kinematic viscosity of the second fluid, $Vi_3$ is a value corresponding to the kinematic viscosity of the third fluid, $BN_1$ is the BN of the first fluid or a value corresponding to the BN of the first fluid, $BN_2$ is the BN of the second fluid or a value corresponding to the BN of the second fluid, and $BN_3$ is the BN of the third fluid or a value corresponding to the BN of the third fluid determining the highest value of $BN_{C1}$, $BN_{C2}$, and $BN_{C3}$;

setting the determined highest value as the upper limit of the determined BN range;

determining the second-highest value of $BN_{C1}$, $BN_{C2}$, and $BN_{C3}$; and setting the determined second-highest value as the lower limit of the determined BN range; and determine that the target BN of the cylinder oil is equal to the upper limit or lower limit of the determined BN range, or is between the upper limit and lower limit of the determined BN range, and determine a ratio of first fluid, second fluid, and third fluid which corresponds to the target kinematic viscosity and the target BN;

or determine that the target BN of the cylinder oil is greater than the determined upper limit of the determined BN range, and determine a ratio of first fluid, second fluid, and third fluid which corresponds to the target kinematic viscosity and the upper limit of the determined BN range;

or determine that the target BN of the cylinder oil is lower than the determined lower limit of the determined BN range, and determine a ratio of first fluid, second fluid, and third fluid which corresponds to the target kinematic viscosity and the lower limit of the determined BN range;

or (b) based on at least the target BN of the cylinder oil to be produced, the kinematic viscosity of each of the first fluid, second fluid, and third fluid, and the BN of each of the first fluid, second fluid, and third fluid, determine a kinematic viscosity range for the cylinder oil having an upper limit and a lower limit; the determining the kinematic viscosity range comprising:

solving:

$$Vi_{C1} = -\frac{Vi_3BN_2 - Vi_3BN_{C(T)} - Vi_2BN_3 + Vi_2BN_{C(T)}}{BN_3 - BN_2} \quad \text{Equation (4)}$$

$$Vi_{C2} = -\frac{Vi_2BN_1 - Vi_2BN_{C(T)} - Vi_1BN_2 + Vi_1BN_{C(T)}}{BN_2 - BN_1} \quad \text{Equation (5)}$$

$$Vi_{C3} = -\frac{Vi_3BN_1 - Vi_3BN_{C(T)} - Vi_1BN_3 + Vi_1BN_{C(T)}}{BN_3 - BN_1} \quad \text{Equation (6)}$$

wherein:

$Vi_{C1}$ is a first calculated value corresponding to a kinematic viscosity for the cylinder oil, $Vi_{C2}$ is a second calculated value corresponding to a kinematic viscosity for the cylinder oil, $Vi_{C3}$ is a third calculated value corresponding to a kinematic viscosity for the cylinder oil $BN_{C(T)}$ is the target BN of the cylinder oil to be produced, $Vi_1$ is a value corresponding to the kinematic viscosity of the first fluid, $Vi_2$ is a value corresponding to the kinematic viscosity of the second fluid, $Vi_3$ is a value corresponding to the kinematic viscosity of the third fluid, $BN_1$ is the BN of the first fluid or a value corresponding to the BN of the first fluid, $BN_2$ is the BN of the second fluid or a value corresponding to the BN of the second fluid, and $BN_3$ is the BN of the third fluid or a value corresponding to the BN of the third fluid;

determining the lowest value of $Vi_{C1}$, $Vi_{C2}$, and $Vi_{C3}$;

setting the determined lowest value as the lower limit of the determined kinematic viscosity range;

determining the second-lowest value of $Vi_{C1}$, $Vi_{C2}$, and $Vi_{C3}$; and setting the determined second-lowest value as the upper limit of the determined kinematic viscosity range; and determine that the target kinematic viscosity of the cylinder oil is equal to the upper limit or lower limit of the determined kinematic viscosity range, or is between the upper limit and lower limit of the determined kinematic viscosity range, and determine a ratio of first fluid, second fluid, and third fluid which corresponds to the target kinematic viscosity and the target BN;

or determine that the target kinematic viscosity of the cylinder oil is greater than the determined upper limit of the determined kinematic viscosity range, and determine a ratio of first fluid, second fluid, and third fluid which corresponds to the target BN and the upper limit of the determined kinematic viscosity range;

or determine that the target kinematic viscosity of the cylinder oil is lower than the determined lower limit of the determined kinematic viscosity range, and determine a ratio of first fluid, second fluid, and third fluid which corresponds to the target BN and the lower limit of the determined kinematic viscosity range;

and generate an instruction for a blender to blend the first fluid, second fluid, and third fluid in the determined ratio.

9. A marine vessel comprising at least one selected from:

an apparatus for the preparation of a cylinder oil comprising:

a blender;

a first container for containing a first fluid having a first kinematic viscosity and a first BN, the first container in selectable fluid communication with the blender;

a second container for containing a second fluid having a second kinematic viscosity and a second BN; the second container in selectable fluid communication with the blender;

a third container for containing a third fluid having a third kinematic viscosity and a third BN, the third container in selectable fluid communication with the blender; and a controller configured to operate in a first mode and/or a second mode and:

obtain data identifying a target kinematic viscosity of the cylinder oil to be produced;

obtain data identifying a target BN of the cylinder oil to be produced;

obtain data identifying the kinematic viscosity and BN of each of the first fluid, the second fluid, and the third fluid;

wherein, when operated in the first mode, the controller is further configured to:

based on at least the target kinematic viscosity of the cylinder oil to be produced, the kinematic viscosity of each of the first fluid, second fluid, and third fluid, and the BN of each of the first fluid, second fluid, and third fluid, determine a BN range for the cylinder oil having an upper limit and a lower limit, the determining the BN range for the cylinder oil comprising:

solving:

$$BN_{C1} = \frac{Vi_2BN_3 + Vi_{C(T)}BN_2 - Vi_{C(T)}BN_3 - Vi_3BN_2}{Vi_2 - Vi_3} \quad \text{Equation (1)}$$

$$BN_{C2} = \frac{Vi_2BN_1 + Vi_{C(T)}BN_2 - Vi_{C(T)}BN_1 - Vi_1BN_2}{Vi_2 - Vi_1} \quad \text{Equation (2)}$$

$$BN_{C3} = \frac{Vi_{C(T)}BN_1 - Vi_{C(T)}BN_3 + Vi_1BN_3 - Vi_3BN_1}{Vi_1 - Vi_3} \quad \text{Equation (3)}$$

wherein:

$BN_{C1}$ is a first calculated BN for the cylinder oil, $BN_{C2}$ is a second calculated BN for the cylinder oil, $BN_{C3}$ is a third calculated BN for the cylinder oil, $Vi_{C(T)}$ is a value corresponding to the target kinematic viscosity of the cylinder oil to be produced, $Vi_1$ is a value corresponding to the kinematic viscosity of the first fluid, $Vi_2$ is a value corresponding to the kinematic viscosity of the second fluid, $Vi_3$ is a value corresponding to the kinematic viscosity of the third fluid, $BN_1$ is the BN of the first fluid or a value corresponding to the BN of the first fluid, $BN_2$ is the BN of the second fluid or a value corresponding to the BN of the second fluid, and $BN_3$ is the BN of the third fluid or a value corresponding to the BN of the third fluid;

determining the highest value of $BN_{C1}$, $BN_{C2}$, and $BN_{C3}$;

setting the determined highest value as the upper limit of the determined BN range;

determining the second-highest value of $BN_{C1}$, $BN_{C2}$, and $BN_{C3}$;

setting the determined second-highest value as the lower limit of the determined BN range; and determine that the target BN of the cylinder oil is equal to the upper limit or lower limit of the determined BN range, or is between the upper limit and lower limit of the determined BN range, and determine a ratio of first fluid, second fluid, and third fluid which corresponds to the target kinematic viscosity and the target BN;

or determine that the target BN of the cylinder oil is greater than the determined upper limit of the determined BN range, and determine a ratio of first fluid, second fluid, and third fluid which corresponds to the target kinematic viscosity and the upper limit of the determined BN range;

or determine that the target BN of the cylinder oil is lower than the determined lower limit of the determined BN range, and determine a ratio of first fluid, second fluid, and third fluid which corresponds to the target kinematic viscosity and the lower limit of the determined BN range;

cause the blender to blend the first fluid, second fluid, and third fluid in the determined ratio to produce the cylinder oil; and wherein, when operated in the second mode, the controller is further configured to:

based on at least the target BN of the cylinder oil to be produced, the kinematic viscosity of each of the first fluid, second fluid, and third fluid, and the BN of each of the first fluid, second fluid, and third fluid, determine a kinematic viscosity range for the cylinder oil having an upper limit and a lower limit, the determining the kinematic viscosity range for the cylinder oil comprising:

solving;

$$Vi_{C1} = -\frac{Vi_3BN_2 - Vi_3BN_{C(T)} - Vi_2BN_3 + Vi_2BN_{C(T)}}{BN_3 - BN_2} \quad \text{Equation (4)}$$

$$Vi_{C2} = -\frac{Vi_2BN_1 - Vi_2BN_{C(T)} - Vi_1BN_2 + Vi_1BN_{C(T)}}{BN_2 - BN_1} \quad \text{Equation (5)}$$

$$Vi_{C3} = -\frac{Vi_3BN_1 - Vi_3BN_{C(T)} - Vi_1BN_3 + Vi_1BN_{C(T)}}{BN_3 - BN_1} \quad \text{Equation (6)}$$

wherein:

$Vi_{C1}$ is a first calculated value corresponding to a kinematic viscosity for the cylinder oil, $Vi_{C2}$ is a second calculated value corresponding to a kinematic viscosity for the cylinder oil, $Vi_{C3}$ is a third calculated value corresponding to a kinematic viscosity for the cylinder oil $BN_{C(T)}$ is the target BN of the cylinder oil to be produced, $Vi_1$ is a value corresponding to the kinematic viscosity of the first fluid, $Vi_2$ is a value corresponding to the kinematic viscosity of the second fluid, $Vi_3$ is a value corresponding to the kinematic viscosity of the third fluid, $BN_1$ is the BN of the first fluid or a value corresponding to the BN of the first fluid, $BN_2$ is the BN of the second fluid or a value corresponding to the BN of the second fluid, and $BN_3$ is the BN of the third fluid or a value corresponding to the BN of the third fluid;

determining the lowest value of $Vi_{C1}$, $Vi_{C2}$, and $Vi_{C3}$;

setting the determined lowest value as the lower limit of the determined kinematic viscosity range;

determining the second-lowest value of $Vi_{C1}$, $Vi_{C2}$, and $Vi_{C3}$;

setting the determined second-lowest value as the upper limit of the determined kinematic viscosity range; and determine that the target kinematic viscosity of the cylinder oil is equal to the upper limit or lower limit of the determined kinematic viscosity range, or is between the upper limit and lower limit of the determined kinematic viscosity range, and determine a ratio of first fluid, second fluid, and third fluid which corresponds to the target kinematic viscosity and the target BN;

or determine that the target kinematic viscosity of the cylinder oil is greater than the determined upper limit of the determined kinematic viscosity range, and determine a ratio of first fluid, second fluid, and third fluid which corresponds to the target BN and the upper limit of the determined kinematic viscosity range;

or determine that the target kinematic viscosity of the cylinder oil is lower than the determined lower limit of the determined kinematic viscosity range, and determine a ratio of first fluid, second fluid, and third fluid which corresponds to the target BN and the lower limit of the determined kinematic viscosity range;

and cause the blender to blend the first fluid, second fluid, and third fluid in the determined ratio to produce the cylinder oil;

or a non-transitory computer-readable storage medium storing instructions that, when executed by a processor, cause the processor to:

obtain data identifying a target kinematic viscosity of a cylinder oil to be produced;

obtain data identifying a target BN of the cylinder oil to be produced;

obtain data identifying the kinematic viscosity and BN of each of a first fluid, a second fluid, and a third fluid;

either:

(a) based on at least the target kinematic viscosity of the cylinder oil to be produced, the kinematic viscosity and the BN of each of the first fluid, the second fluid, and the third fluid, determine a BN range for the cylinder oil having an upper limit and a lower limit, the determining the BN range for the cylinder oil comprising:

solving:

$$BN_{C1} = \frac{Vi_2BN_3 + Vi_{C(T)}BN_2 - Vi_{C(T)}BN_3 - Vi_3BN_2}{Vi_2 - Vi_3} \quad \text{Equation (1)}$$

$$BN_{C2} = \frac{Vi_2BN_1 + Vi_{C(T)}BN_2 - Vi_{C(T)}BN_1 - Vi_1BN_2}{Vi_2 - Vi_1} \quad \text{Equation (2)}$$

$$BN_{C3} = \frac{Vi_{C(T)}BN_1 - Vi_{C(T)}BN_3 + Vi_1BN_3 - Vi_3BN_1}{Vi_1 - Vi_3} \quad \text{Equation (3)}$$

wherein:

$BN_{C1}$ is a first calculated BN for the cylinder oil, $BN_{C2}$ is a second calculated BN for the cylinder oil, $BN_{C3}$ is a third calculated BN for the cylinder oil, $Vi_{C(T)}$ is a value corresponding to the target kinematic viscosity of the cylinder oil to be produced, $Vi_1$ is a value corresponding to the kinematic viscosity of the first fluid, $Vi_2$ is a value corresponding to the kinematic viscosity of the second fluid, $Vi_3$ is a value corresponding to the kinematic viscosity of the third fluid, $BN_1$ is the BN of the first fluid or a value corresponding to the BN of the first fluid, $BN_2$ is the BN of the second fluid or a value corresponding to the BN of the second fluid, and $BN_3$ is the BN of the third fluid or a value corresponding to the BN of the third fluid;

determining the highest value of $BN_{C1}$, $BN_{C2}$, and $BN_{C3}$;

setting the determined highest value as the upper limit of the determined BN range;

determining the second-highest value of $BN_{C1}$, $BN_{C2}$, and $BN_{C3}$;

setting the determined second-highest value as the lower limit of the determined BN range; and determine that the target BN of the cylinder oil is equal to the upper limit or lower limit of the determined BN range, or is between the upper limit and lower limit of the determined BN range, and determine a ratio of first fluid, second fluid, and third fluid which corresponds to the target kinematic viscosity and the target BN;

or determine that the target BN of the cylinder oil is greater than the determined upper limit of the determined BN range, and determine a ratio of first fluid, second fluid, and third fluid which corresponds to the target kinematic viscosity and the upper limit of the determined BN range;

or determine that the target BN of the cylinder oil is lower than the determined lower limit of the determined BN range, and determine a ratio of first fluid, second fluid, and third fluid which corresponds to the target kinematic viscosity and the lower limit of the determined BN range;

or (b) based on at least the target BN of the cylinder oil to be produced, the kinematic viscosity of each of the first fluid, second fluid, and third fluid, and the BN of each of the first fluid, second fluid, and third fluid, determine a kinematic viscosity range for the cylinder oil having an upper limit and a lower limit, the determining the kinematic viscosity range for the cylinder oil comprising:

solving;

$$Vi_{C1} = -\frac{Vi_3BN_2 - Vi_3BN_{C(T)} - Vi_2BN_3 + Vi_2BN_{C(T)}}{BN_3 - BN_2} \quad \text{Equation (4)}$$

$$Vi_{C2} = -\frac{Vi_2BN_1 - Vi_2BN_{C(T)} - Vi_1BN_2 + Vi_1BN_{C(T)}}{BN_2 - BN_1} \quad \text{Equation (5)}$$

$$Vi_{C3} = -\frac{Vi_3BN_1 - Vi_3BN_{C(T)} - Vi_1BN_3 + Vi_1BN_{C(T)}}{BN_3 - BN_1} \quad \text{Equation (6)}$$

wherein:

$Vi_{C1}$ is a first calculated value corresponding to a kinematic viscosity for the cylinder oil, $Vi_{C2}$ is a second calculated value corresponding to a kinematic viscosity for the cylinder oil, $Vi_{C3}$ is a third calculated value corresponding to a kinematic viscosity for the cylinder oil $BN_{C(T)}$ is the target BN of the cylinder oil to be produced, $Vi_1$ is a value corresponding to the kinematic viscosity of the first fluid, $Vi_2$ is a value corresponding to the kinematic viscosity of the second fluid, $Vi_3$ is a value corresponding to the kinematic viscosity of the third fluid, $BN_1$ is the BN of the first fluid or a value corresponding to the BN of the first fluid, $BN_2$ is the BN of the second fluid or a value corresponding to the BN of the second fluid, and $BN_3$ is the BN of the third fluid or a value corresponding to the BN of the third fluid;

determining the lowest value of $Vi_{C1}$, $Vi_{C2}$, and $Vi_{C3}$;

setting the determined lowest value as the lower limit of the determined kinematic viscosity range;

determining the second-lowest value of $Vi_{C1}$, $Vi_{C2}$, and $Vi_{C3}$;

setting the determined second-lowest value as the upper limit of the determined kinematic viscosity range; and determine that the target kinematic viscosity of the cylinder oil is equal to the upper limit or lower limit of the determined kinematic viscosity range, or is between the upper limit and lower limit of the determined kinematic viscosity range, and determine a ratio of first fluid, second fluid, and third fluid which corresponds to the target kinematic viscosity and the target BN;

or determine that the target kinematic viscosity of the cylinder oil is greater than the determined upper limit of the determined kinematic viscosity range, and determine a ratio of first fluid, second fluid, and third fluid which corresponds to the target BN and the upper limit of the determined kinematic viscosity range;

or determine that the target kinematic viscosity of the cylinder oil is lower than the determined lower limit of the determined kinematic viscosity range, and determine a ratio of first fluid, second fluid, and third fluid which corresponds to the target BN and the lower limit of the determined kinematic viscosity range;

and generate an instruction for a blender to blend the first fluid, second fluid, and third fluid in the determined ratio.

* * * * *